US012077011B2

(12) United States Patent
Komatsu et al.

(10) Patent No.: US 12,077,011 B2
(45) Date of Patent: Sep. 3, 2024

(54) PRINTING APPARATUS, PRINTING SYSTEM AND PRINTING METHOD FOR PRINTING APPARATUS

(71) Applicant: Seiko Epson Corporation, Tokyo (JP)

(72) Inventors: Shin Komatsu, Shiojiri (JP); Satoru Kobayashi, Shiojiri (JP); Shigenori Nakagawa, Tatsuno-machi (JP); Yoshitaka Miyajima, Matsumoto (JP); Saeko Maruyama, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 133 days.

(21) Appl. No.: 17/646,230

(22) Filed: Dec. 28, 2021

(65) Prior Publication Data

US 2022/0203748 A1 Jun. 30, 2022

(30) Foreign Application Priority Data

Dec. 28, 2020 (JP) ................................ 2020-218889

(51) Int. Cl.
*B41J 11/00* (2006.01)
*B41J 2/485* (2006.01)
*B41M 7/00* (2006.01)

(52) U.S. Cl.
CPC ................................ *B41M 7/0018* (2013.01)

(58) Field of Classification Search
CPC ............ B41J 2/485; B41J 2/50; B41J 11/007
See application file for complete search history.

(56) References Cited

U.S. PATENT DOCUMENTS

2009/0045372 A1 2/2009 Craamer et al.

FOREIGN PATENT DOCUMENTS

JP 2015-218419 12/2015
JP 2019026998 A * 2/2019
JP 2019-218636 12/2019

OTHER PUBLICATIONS

Usui, Machine TranslationofJP-2019026998-A, 2019 (Year: 2019).*

* cited by examiner

*Primary Examiner* — Scott A Richmond
(74) *Attorney, Agent, or Firm* — WORKMAN NYDEGGER

(57) ABSTRACT

A printing apparatus includes a glue belt as an example of a transport belt including a support unit configured to support a medium, the support unit being configured to transport a medium by moving the support unit, a liquid ejecting unit configured to eject liquid onto a medium supported by the support unit, and a dyeing unit configured to perform dyeing by immersing a medium in dyeing liquid. Printing is performed on the medium by combining dyeing by the dyeing unit and ejecting by the liquid ejecting unit.

11 Claims, 21 Drawing Sheets

PRINTING APPARATUS, PRINTING SYSTEM AND PRINTING METHOD FOR PRINTING APPARATUS

The present application is based on, and claims priority from JP Application Serial Number 2020-218889, filed Dec. 28, 2020, the disclosure of which is hereby incorporated by reference herein in its entirety.

BACKGROUND

1. Technical Field

The present disclosure relates to a printing apparatus including a liquid ejecting unit for ejecting liquid and performing printing on a medium, a printing system, and a printing method for the printing apparatus.

2. Related Art

JP-A-2015-218419 discloses an inkjet recording device for performing recording on a medium such as a fabric as an example of this type of printing apparatus. The inkjet recording device includes a transport means for transporting the fabric, a recording means for ejecting ink onto the fabric by an inkjet method and performing recording, and a cleaning means for cleaning the fabric. In the inkjet recording device described in JP-A-2015-218419, a configuration is disclosed in which a background image is printed on a medium by ejecting liquid from a head configured to perform scanning.

However, when printing the background image on a medium is performed by ejecting liquid from the head scanned by the inkjet recording device, there is a problem that banding occurs depending on transport accuracy of the printer. Note that the banding refers to a line (streak) formed in a streak shape along a head scanning direction in the image. The banding includes a white streak that extends along the head scanning direction in which a small gap where no ink is attached between scanning lines occur, and a dark streak that extends along the head scanning direction caused by overlapping and adhering of ink between adjacent scanning lines.

SUMMARY

A printing apparatus for solving the above-described problems includes a transport belt including a support unit configured to support a medium, the transport belt being configured to transport a medium by moving the support unit, a liquid ejecting unit configured to eject liquid onto a medium supported by the support unit, and a dyeing unit configured to perform dyeing by immersing a medium in dyeing liquid, wherein the printing apparatus is configured to perform printing on a medium by combining dyeing by the dyeing unit and ejecting by the liquid ejecting unit.

A printing system for solving the above-described problems includes the above printing apparatus, and a drying mechanism configured to dry both a medium printed by the liquid ejecting unit and a medium dyed by the dyeing unit.

A printing system for solving the above-described problems is a printing system including the above printing apparatus, wherein the cleaning liquid storage unit is configured to store the cleaning liquid or the dyeing liquid, and the printing system includes a holding tank coupled to the cleaning liquid storage unit, the holding tank being configured to hold the cleaning liquid or the dyeing liquid stored in the cleaning liquid storage unit.

A printing apparatus for solving the above-described problems includes a transport belt including a support unit configured to support a medium, the transport belt being configured to transport a medium by moving the support unit, a liquid ejecting unit configured to eject liquid onto a medium supported by the support unit, and a dyeing unit configured to perform dyeing on a medium by dropping dyeing liquid, wherein the printing apparatus is configured to perform printing on a medium by combining dyeing by the dyeing unit and ejecting by the liquid ejecting unit.

A printing system for solving the above-described problems is a printing system including the above printing apparatus, and a drying mechanism configured to dry both a medium printed by the liquid ejecting unit and a medium dyed by the dyeing unit.

A printing system for solving the above-described problems is a printing system including the above printing apparatus, the system including a cleaning unit configured to perform cleaning operation on the transport belt using cleaning liquid, and a cleaning liquid storage unit configured to store the cleaning liquid, wherein the cleaning liquid storage unit is configured to store a pre-treatment agent in a case where the ink is ejected from the liquid ejecting unit, and pre-treatment is performed by immersing a medium in the pre-treatment agent stored in the cleaning liquid storage unit.

A printing method for a printing apparatus for solving the above-described problems is a printing method for a printing apparatus including a transport belt including a support unit configured to support a medium, the transport belt being configured to transport a medium by moving the support unit, a liquid ejecting unit configured to eject liquid onto a medium supported by the support unit, a cleaning unit configured to perform cleaning operation on the transport belt using cleaning liquid, a cleaning liquid storage unit configured to store the cleaning liquid, and a dyeing unit configured to perform dyeing by immersing a medium in dyeing liquid, the method including ejecting liquid from the liquid ejecting unit, storing the dyeing liquid in the cleaning liquid storage unit, and dyeing a medium with the dyeing liquid.

DESCRIPTION OF EXEMPLARY EMBODIMENTS

First Exemplary Embodiment

Figure 1:
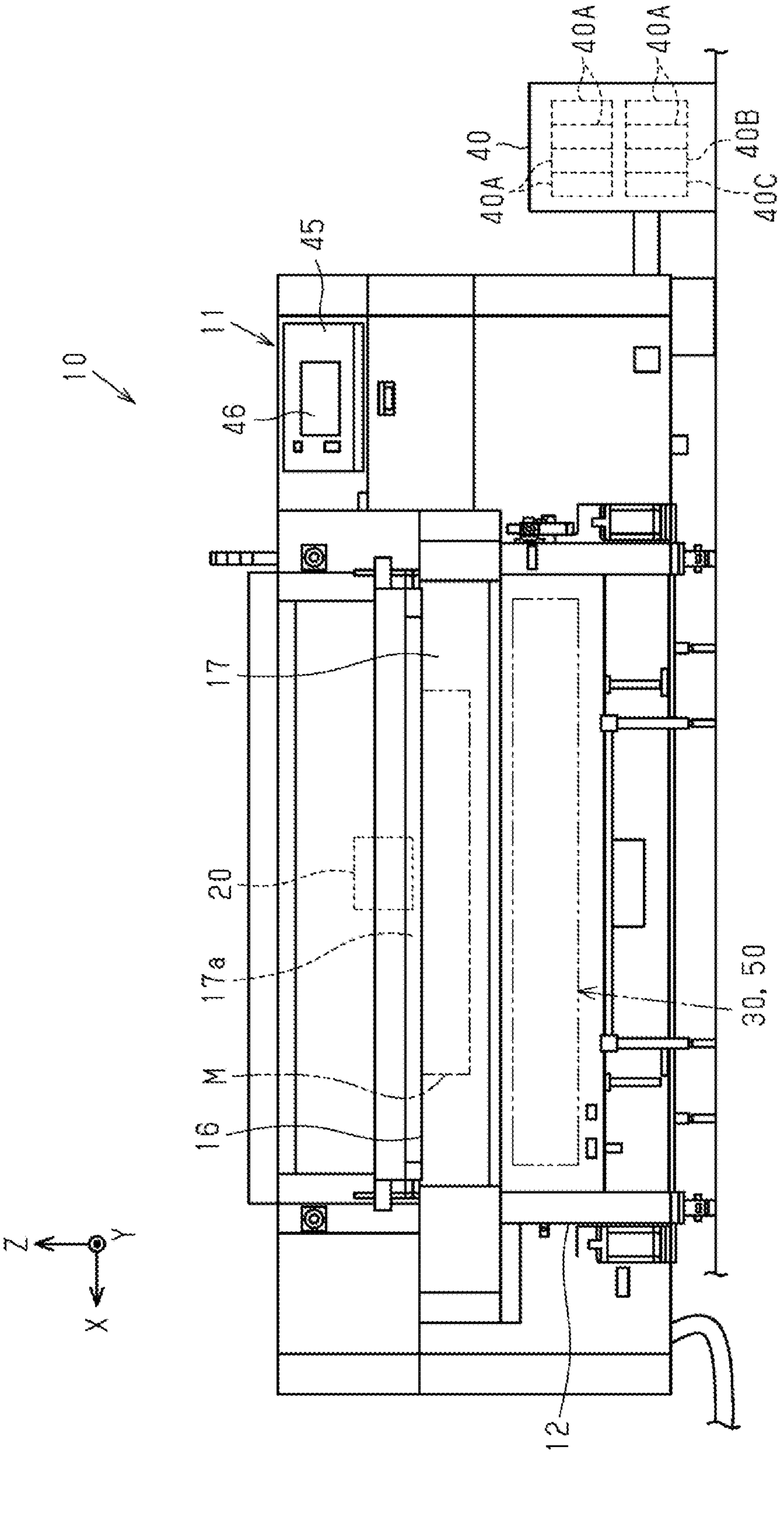
FIG. 1 is a front view illustrating a configuration of a printing system according to a first exemplary embodiment.

Hereinafter, a first exemplary embodiment of a printing apparatus including a liquid ejecting unit and a dyeing unit, a printing system including the printing apparatus, and a printing method will be described with reference to the drawings. The printing system includes, for example, an inkjet type printer in which a medium such as a fabric or paper is supported by a transport belt, and ink, which is an example of a liquid, is ejected onto the medium for printing.

In the drawings, a direction of gravity is indicated by a Z-axis while assuming that a printing apparatus 11 is placed at a horizontal surface, and directions along a plane intersecting the Z-axis are indicated by an X-axis and a Y-axis. The X, Y, and Z axes are orthogonal to each other. In the following description, the X-axis direction is also referred to as a width direction X, the Y-axis direction as a horizontal direction Y, and the Z-axis direction as a vertical direction Z. In this case, when distinguishing left and right in a device width direction, the left is referred to as the +X direction, and the right is referred to as the −X direction. When distinguishing between front and back in the device depth direction, the front is referred to as the +Y direction, and the back is referred to as the −Y direction. When distinguishing between upper and lower in the device height direction, the upper is referred to as the +Z direction, and the lower is referred to as the −Z direction.

Configuration of Printing System

Figure 2:
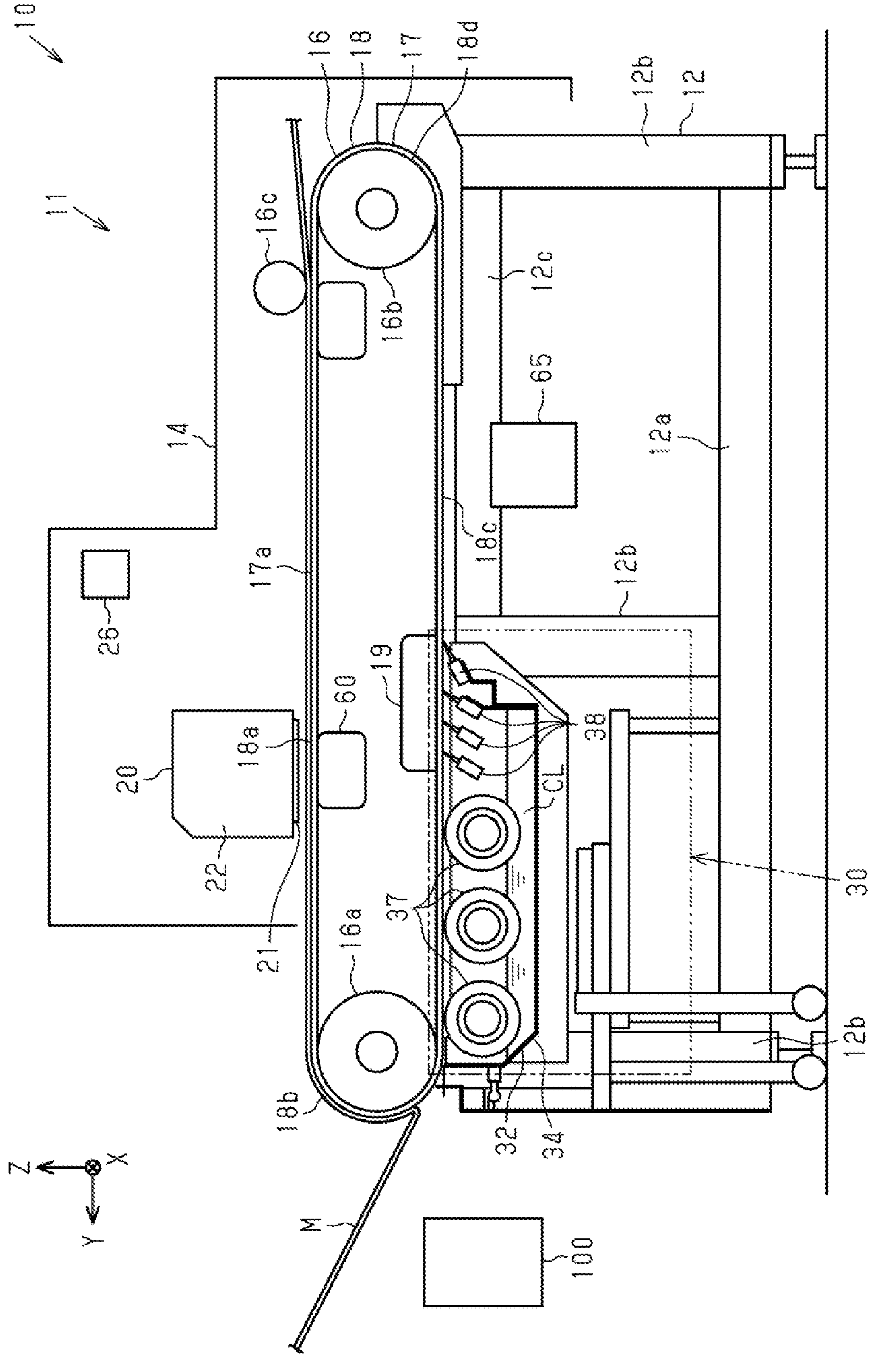
FIG. 2 is a side cross-sectional view illustrating an internal structure of the printing system.

As illustrated in FIGS. 1 and 2, a printing system 10 includes the printing apparatus 11 for performing printing on a medium M, and a drying mechanism 100 (see FIG. 2) for drying the medium M printed by the printing apparatus 11. The printing apparatus 11 includes a transport unit 16 having a glue belt 17 that is an example of a transport belt including a support unit 17*a* configured to support the medium M, the transport belt being configured to transport the medium M by moving the support unit 17*a*. The printing apparatus 11 includes a liquid ejecting unit 20 that ejects liquid onto the medium M supported by the glue belt 17 to perform printing operation, a cleaning unit 30 that cleans the glue belt 17 with washing liquid, a liquid storage unit 40 capable of supplying liquid to the liquid ejecting unit 20, and a dyeing unit 50 that performs dyeing by immersing the medium M in the dyeing liquid. The printing apparatus 11 performs printing on the medium M by combining dyeing by the dyeing unit 50 and ejecting of the liquid at the liquid ejecting unit 20. Here, the printing may be performed by printing the operation of each of the dyeing performed by ejecting the liquid at the liquid ejecting unit 20 and the dyeing performed by immersing the medium M in the dyeing liquid, or may be performed by both the ejecting and the dyeing.

The liquid storage unit 40 is, for example, a cartridge or a liquid tank that stores liquid. The liquid storage unit 40 stores the same liquid as the liquid ejected by the liquid ejecting unit 20. The liquid is, for example, ink, but may be liquid other than ink. Examples of liquid other than ink include a pre-treatment agent or a post-treatment agent. As illustrated in FIG. 1, the liquid storage unit 40 may include an ink storage unit 40A that stores ink as an example of liquid, a pre-treatment agent storage unit 40B that stores a pre-treatment agent as an example of liquid, and a post-treatment agent storage unit 40C that stores a post-treatment agent. The ink storage unit 40A may include a plurality of the ink storage units 40A that store ink having a plurality of colors, respectively. In a case where the liquid ejecting unit 20 is configured to eject the ink having a plurality of colors to perform color printing, the plurality of ink storage units 40A respectively store the ink having the color used for color printing by the liquid ejecting unit 20. For example, in a case where the liquid ejecting unit 20 is configured to perform color printing with ink having N colors, the liquid storage unit 40 includes N ink storage units 40A that store the ink having N colors, respectively. The N colors are, for example, 4 or 8 colors. For example, in a case where the color printing is performed in four colors, provided are four ink storage units 40A that store the ink having four colors of cyan, magenta, yellow, and black, respectively. In addition, in a case where the color printing is performed in eight colors, provided are eight ink storage units 40A that store the ink having eight colors in which four colors of red, blue, gray and orange are added to the aforementioned four colors.

As illustrated in FIG. 1, the printing apparatus 11 includes a housing 12 having a column beam structure, and a cover 14. The column beam structure supports the transport unit 16, the liquid ejecting unit 20, the cleaning unit 30, and the dyeing unit 50. The cover 14 covers a scanning region, which is a region in which the liquid ejecting unit 20 moves in a scanning direction X during printing. The printing apparatus 11 includes an operation unit 45 operated by a user. The operation unit 45 includes, for example, a display unit 46 including a touch panel type screen, a button for operation, etc.

The cleaning unit 30 and the dyeing unit 50 are provided in a region inside the column beam structure of the housing 12 and below the glue belt 17. The cleaning unit 30 cleans the underside of the glue belt 17. The dyeing unit 50 is disposed at a position below the transport unit 16 to perform dyeing on the medium M.

As illustrated in FIG. 1, the printing apparatus 11 includes the liquid storage unit 40 capable of supplying liquid to the liquid ejecting unit 20.

In addition, the liquid ejecting unit 20 is capable of ejecting at least one of a dye extracting agent for extracting the color of the medium M and a dye preventing agent for preventing coloring due to dyeing. As a result, the pre-treatment agent storage unit 40B stores the dye preventing agent as an example of the pre-treatment agent. In addition, the post-treatment agent storage unit 40C stores the dye extracting agent as an example of the post-treatment agent. The pre-treatment agent storage unit 40B and the post-treatment agent storage unit 40C are constituted by a cartridge or a tank, similar to the ink storage unit 40A.

Provided are the cleaning unit 30 that performs cleaning operation on the glue belt 17, which is an example of the transport belt, using the cleaning liquid, and a cleaning liquid storage unit 32 that stores the cleaning liquid. When dyeing is performed by the dyeing unit 50, the dyeing liquid is stored in a storage tank 34.

FIG. 2 illustrates the printing apparatus 11 when the liquid ejecting unit 20 performs printing on the medium M. As illustrated in FIG. 2, the printing apparatus 11 includes the transport unit 16 that transports the medium M by the glue belt 17, the liquid ejecting unit 20 that ejects ink onto the medium M to perform printing, the cleaning unit 30 that cleans the glue belt 17, and a drying unit 65 that dries the cleaning liquid remaining adhered to the glue belt 17 after cleaning, as described above. Further, the printing apparatus 11 includes the transport unit 16, the liquid ejecting unit 20, and a control unit 26 configured to control the cleaning unit 30. The transport unit 16, the liquid ejecting unit 20, and the cleaning unit 30 are each disposed at a predetermined height position by being supported by the housing 12 having a column beam structure. The housing 12 has the column beam structure including a bottom frame 12*a*, a column frame 12*b*, and a top frame 12*c*. Further, in the printing apparatus, the cover 14 is an exterior member that covers each portion of the printing apparatus 11.

As illustrated in FIG. 2, the transport unit 16 is provided at an upper portion of the housing 12, and includes a driving roller 16*a*, a driven roller 16*b*, a glue belt 17, and a feed roller (not illustrated). Then, the transport unit 16 can transport the medium M in the +Y direction as the glue belt 17 moves due to the rotation of the driving roller 16*a*. In the +Y direction, the driving roller 16*a* is disposed downstream and the driven roller 16*b* is disposed upstream. Further, both the driving roller 16*a* and the driven roller 16*b* have a rotation axis along the X direction. The transport unit 16 is controlled by the control unit 26 described below.

The glue belt 17 is configured as an endless belt at which both ends of an elastic flat plate are joined. The glue belt 17 is wound around an outer circumferential surface of the driving roller 16*a* and an outer circumferential surface of the driven roller 16*b*. In other words, the glue belt 17 is provided at the housing 12 and is capable of transporting the medium M by being moved around.

A surface 18 of the glue belt 17 has, for example, adhesiveness, and is capable of supporting and adsorbing the medium M. The "adhesiveness" refers to a property that can be temporarily adhered to another member and capable of peeling from an adhered state.

At the surface 18, a direction that intersects with the +Y direction, which is the movement direction of the glue belt 17, is the X direction. Of the surface 18, a portion located in the +Z direction from the center of the driving roller 16*a* and along the XY plane is referred to as an upper surface portion 18*a*. The upper surface portion 18*a* supports the medium M. In other words, the upper surface portion 18*a* constitutes an example of a support unit that supports the medium M. In addition, of the surface 18, a portion wound around the driving roller 16*a* is referred to as a curved surface portion 18*b*. Furthermore, of the surface 18, a portion located in the −Z direction relative to the center of the driving roller 16*a*, and along the XY plane, is referred to as a lower surface portion 18*c*. In addition, the portion wound around the driven roller 16*b* is referred to as a curved surface portion 18*d*. Further, a pressurizing roller 16*c* that presses the medium M to adhere the medium M to the upper surface portion 18*a* is provided at a position upstream of the position where the liquid ejecting unit 20 faces the upper surface portion 18*a* in the transport direction Y.

The transport unit 16 can change the transport speed of the medium M by adjusting the rotational speed of the driving roller 16*a* per unit time. The medium M is peeled from the curved surface portion 18*b* by winding the medium M by a winding roller (not illustrated). The medium M that has been peeled from the curved surface portion 18*b* is dried by the drying mechanism 100 on the route to the winding roller. The medium M dried by the drying mechanism 100 is wound on the winding roller (not illustrated). Note that the drying mechanism 100 may be provided as part of a winding device that includes the winding roller.

As illustrated in FIG. 2, the liquid ejecting unit 20 is provided above the transport unit 16. The liquid ejecting unit 20 is configured to allow for performing recording on the medium M transported in the +Y direction. The liquid ejecting unit 20 includes a liquid ejecting head 21 and a carriage 22 that movably supports the liquid ejecting head 21 along the X direction. The liquid ejecting head 21 is disposed in the +Z direction with respect to the medium M, and performs recording on the medium M by ejecting ink as an example of liquid onto the recording surface of the medium M. The liquid ejecting unit 20 is controlled by the control unit 26.

As illustrated in FIG. 2, the cleaning unit 30 includes the cleaning liquid storage unit 32 that stores the cleaning liquid, a cleaning brush 37 as an example of the cleaning unit for cleaning the glue belt 17 using the cleaning liquid, and a squeegee 38. The cleaning unit 30 of the present example includes a plurality of (e.g., three) the cleaning brushes 37 and a plurality of (e.g., four) the squeegees 38. The squeegee 38 is a rubber blade that scrapes the cleaning liquid from the surface of the glue belt 17.

As illustrated in FIG. 2, the cleaning unit 30 performs cleaning of the glue belt 17 during printing in which the liquid ejecting unit 20 ejects liquid to perform printing on the medium M. The cleaning unit 30 includes the cleaning liquid storage unit 32 that stores the cleaning liquid (washing liquid). The cleaning liquid storage unit 32 includes the storage tank 34 formed from a tank opened upward. When the liquid ejecting unit 20 is not performing printing to eject the liquid, the storage tank 34 is not used. In the present exemplary embodiment, the cleaning unit 30 and the dyeing unit 50 share the storage tank 34, which is a component of these components.

As the liquid ejecting unit 20 performs recording on the medium M, liquid may adhere to the surface 18 of the glue belt 17. For example, when the medium M is a cloth, liquid such as a strike-through ink may adhere to the surface 18. Also, when the medium M is peeled from the surface 18, debris of the cloth may remain at the surface 18. The liquid such as ink adhered to the surface 18 causes the medium M to become contaminated, and the debris remaining at the surface 18 causes the adhesive force of the medium M to the surface 18 to be reduced. In the cleaning liquid storage unit 32, the surface 18 of the glue belt 17 is cleaned by the cleaning brush 37 in order to remove the liquid adhering to the surface 18 and the debris caused by the medium base material.

Figure 3:
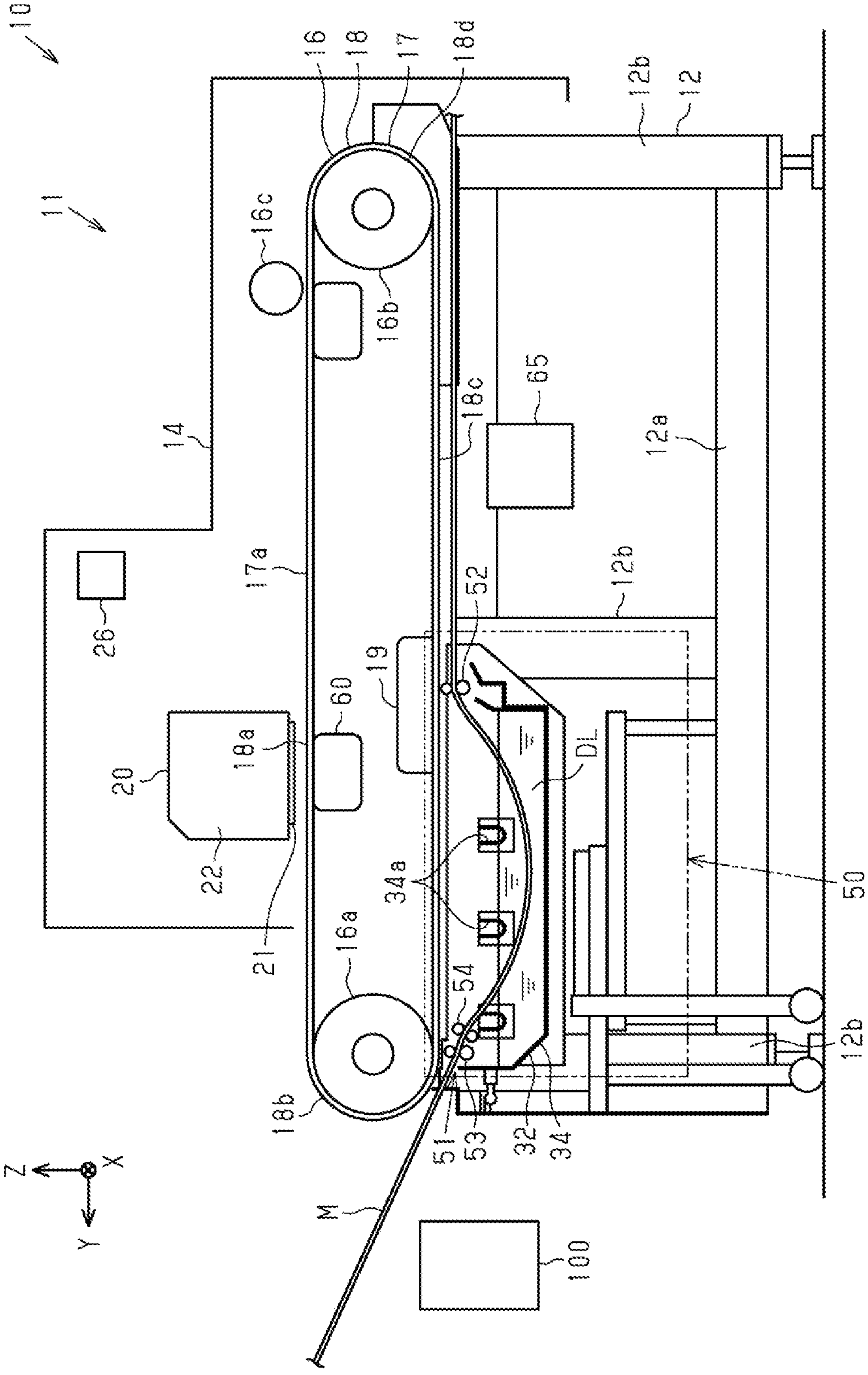
FIG. 3 is a side cross-sectional view illustrating the printing system including a dyeing unit.

FIG. 3 illustrates the printing apparatus 11 when the dyeing unit 50 performs dyeing on the medium M. As illustrated in FIG. 3, when the liquid ejecting unit 20 does not perform printing and the cleaning unit 30 does not use the cleaning liquid storage unit 32, the dyeing unit 50 stores dyeing liquid DL in the cleaning liquid storage unit 32 and performs dyeing. Then, the dyeing unit 50 performs dyeing on the medium M by immersing the medium M in the dyeing liquid DL stored instead of the cleaning liquid CL in the storage tank 34.

Thus, as illustrated in FIG. 2, the cleaning brush 37 and squeegee 38 are removably attached to the storage tank 34. When the cleaning liquid storage unit 32 is used as the dyeing unit 50, the cleaning brush 37 and the squeegee 38 are removed, as illustrated in FIG. 3. As illustrated in FIG. 3, a brush support unit 34*a* that rotatably supports the cleaning brush 37 is provided at the inside surface of the storage tank 34. Note that the dyeing unit 50 utilizes the cleaning brush 37 for agitating the dyeing liquid DL in the process of preparing the dyeing liquid DL in the storage tank 34.

The dyeing unit 50 uses the liquid stored in the liquid storage unit 40 as at least part of the dyeing liquid DL. The liquid (waste liquid) discharged from the liquid ejecting unit 20 is temporarily stored for each liquid type (for example, for each color) in maintenance operation by the maintenance unit 60, and the dyeing liquid DL for the color required when performing dyeing is stored in the storage tank 34. Then, in the storage tank 34, when the waste liquid used as the dyeing liquid DL is insufficient, the ink stored in the ink storage unit 40A is supplied as the dyeing liquid DL to the storage tank 34. For example, since there is no waste liquid due to the maintenance operation at the initial stage of using the printing apparatus 11, only the ink supplied from the ink storage unit 40A is used as the dyeing liquid DL. That is, all the dyeing liquid DL is supplied from the ink storage unit 40A. After a predetermined period of time has passed from the start of use of the printing apparatus 11, and when the waste liquid for each color is accumulated in the dyeing liquid storage unit 71 by flushing and cleaning, the waste liquid is supplied to the cleaning liquid storage unit 32 and used as at least part of the dyeing liquid DL.

As illustrated in FIG. 2, when performing printing by the liquid ejecting unit 20, the drying mechanism 100 is disposed at a position between the transport unit 16 and the winding device (not illustrated), and dries the medium M after printing. Furthermore, as illustrated in FIG. 3, when the medium M is dyed by the dyeing unit 50, the drying mechanism 100 is disposed at a position on the downstream in the transport direction Y with respect to the dyeing unit 50, and drying the medium M after dyeing. In the present exemplary embodiment, the drying mechanism 100 dries both the medium M printed by the liquid ejecting unit 20 and the medium M dyed by the dyeing unit 50.

Configuration of Cleaning Unit

Figure 4:
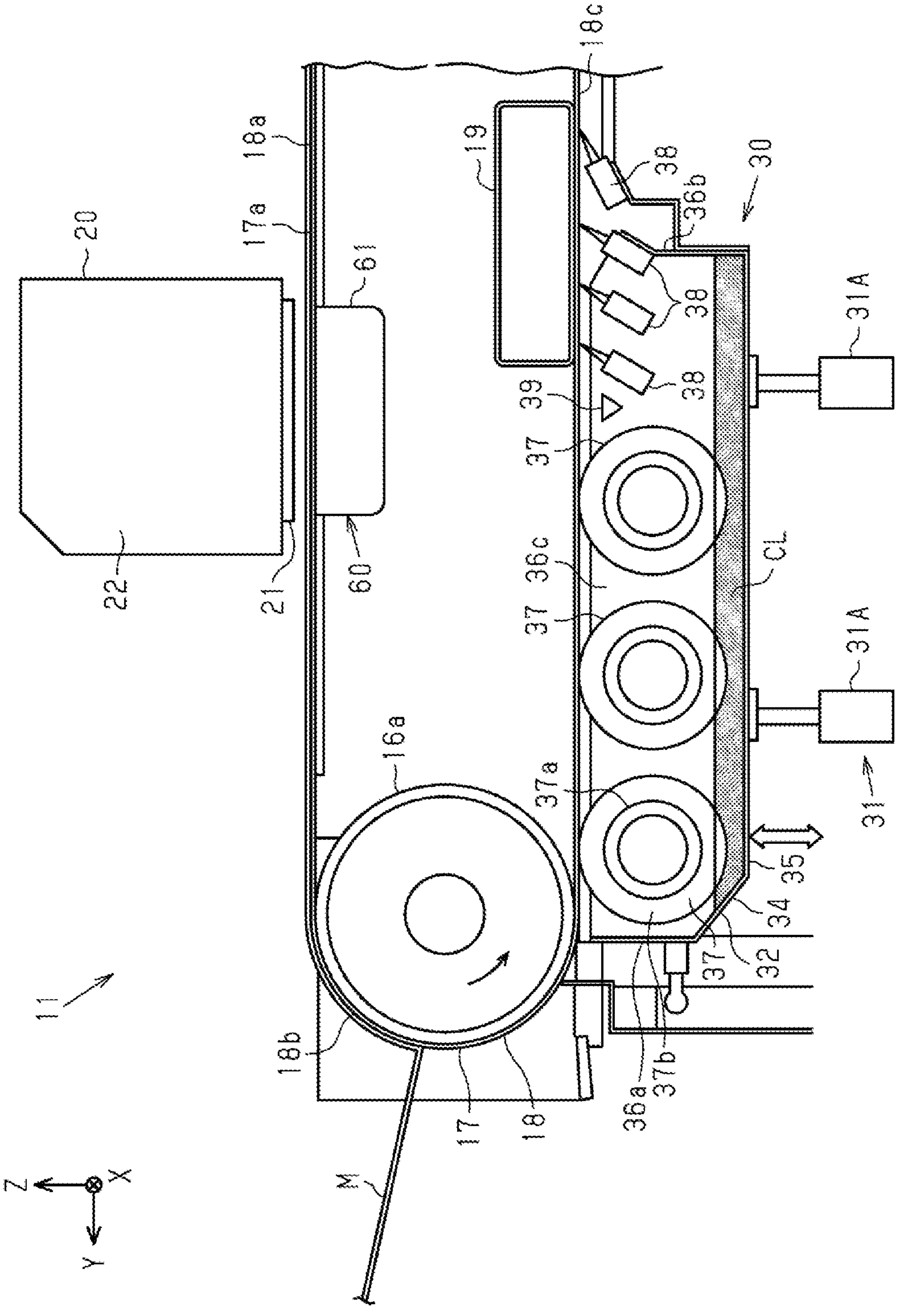
FIG. 4 is a schematic side cross-sectional view illustrating a cleaning unit.

Next, a configuration of the cleaning unit 30 will be described in detail with reference to FIG. 4. As illustrated in FIG. 4, the cleaning unit 30 includes a plurality of (e.g., three) the cleaning brushes 37 and a plurality of (e.g., four) the squeegees 38. In addition, the cleaning unit 30 includes an elevator mechanism 31 that supports the storage tank 34 of the cleaning liquid storage unit 32 so as to be raised and lowered. The storage tank 34 can be raised and lowered in the Z direction as indicated by the white arrow in FIG. 4 relative to the glue belt 17. The height position in the Z direction of the storage tank 34 is adjusted so that the cleaning brush 37 rotatably supported by the brush support unit 34*a* (see FIG. 3) provided at the inside surface of the storage tank 34 is located at a height at which the cleaning brush 37 can contact the surface 18 of the glue belt 17. The elevator mechanism 31 includes one or more elevator actuators 31A in a state in which a movable portion thereof is fixed to a bottom wall 35 of the storage tank 34. The elevator actuator 31A is constituted by, for example, an air cylinder, a linear motor, a hydraulic cylinder, a ball screw mechanism, etc.

As illustrated in FIG. 4, when the liquid ejecting unit 20 performs printing, the cleaning liquid CL is stored in the storage tank 34. The cleaning liquid CL is stored in the storage tank 34 up to the height of the liquid level at which the lower portion of the cleaning brush 37 is immersed. The amount of the cleaning liquid CL stored in the storage tank 34 can be arbitrarily set as long as a portion of the cleaning brush 37 is immersed.

The storage tank 34 is disposed below the driving roller 16*a* and the glue belt 17. The storage tank 34 includes the bottom wall 35, a front wall 36*a*, a rear wall 36*b*, and a pair of side walls 36*c*. The bottom wall 35 is formed into a rectangular plate shape having a predetermined thickness in the Z direction and is disposed along the XY plane. The front wall 36*a* stands upright in the +Z direction at the end of the bottom wall 35 in the +Y direction. The back wall 36*b* stands upright in the +Z direction at the end of the bottom wall 35 in the −Y direction. The pair of side walls 36*c* are disposed at an end in the +X direction and an end in the −X direction of the bottom wall 35, and stands upright from the bottom wall 35 in the +Z direction. In other words, the storage tank 34 has a box shape in which the upper side thereof is open. The cleaning liquid CL for cleaning the surface 18 is stored in a space inside the box shape, which is enclosed by the bottom wall 35, the front wall 36*a*, the rear wall 36*b*, and the pair of side walls 36*c*. That is, the storage tank 34 stores the cleaning liquid CL supplied to the cleaning brush 37 when the cleaning operation is performed inside the box shape in which the upper side thereof is open.

The cleaning brush 37 has a cylindrical shaft portion 37*a* and a brush portion 37*b* that extends radially from the outer circumferential surface of the shaft portion 37*a*. The shaft portion 37*a* extends along the X direction and is rotatably supported with respect to the brush support unit 34*a* provided at the inner surface of the pair of side walls 36*c*. The cleaning brush 37 is removably attached to the brush support 34*a*.

The brush portion 37*b* is configured to be able to contact the lower surface portion 18*c* in a state in which the cleaning liquid storage unit 32 rises in the +Z direction. The cleaning brush 37 is rotated by a motor 30M (see FIGS. 6 and 7) to remove the liquid adhering to the lower surface portion 18*c* and the debris caused by the medium base material, using the cleaning liquid CL stored in the storage tank 34. In other words, the cleaning brush 37 performs the cleaning operation of the glue belt 17 using the cleaning liquid CL stored in the storage tank 34. The liquid and the debris caused by the medium base material removed from the glue belt 17 by the cleaning brush 37 is collected by being mixed into the cleaning liquid CL in the storage tank 34.

The squeegee 38 is attached to a plate-like portion extending from near the rear wall 36*b* of the storage tank 34 in a posture inclined obliquely with respect to the lower surface portion 18*c*. The squeegee 38 scrapes the cleaning liquid CL, etc. remaining at the lower surface portion 18*c* after cleaning by the cleaning brush 37 from the lower surface portion 18*c*. Note that an inner frame 19 is provided inside the portion with which a tip portion of the squeegee 38 in the glue belt 17 comes into contact. The inner frame 19 is erected in the X direction in the housing 12 to support the glue belt 17 from inside. This allows the glue belt 17 to resist pressurization from the squeegee 38. In addition, the cleaning unit 30 includes a liquid volume sensor 39 that detects a liquid volume of the liquid stored in the cleaning liquid storage unit 32. When it is detected that the amount of the cleaning liquid CL is less than the lower limit amount by the liquid volume sensor 39, the control unit 26 replenishes the cleaning liquid CL or notifies the user of information indicating that the cleaning liquid is insufficient.

Configuration of Dyeing Unit

Figure 5:
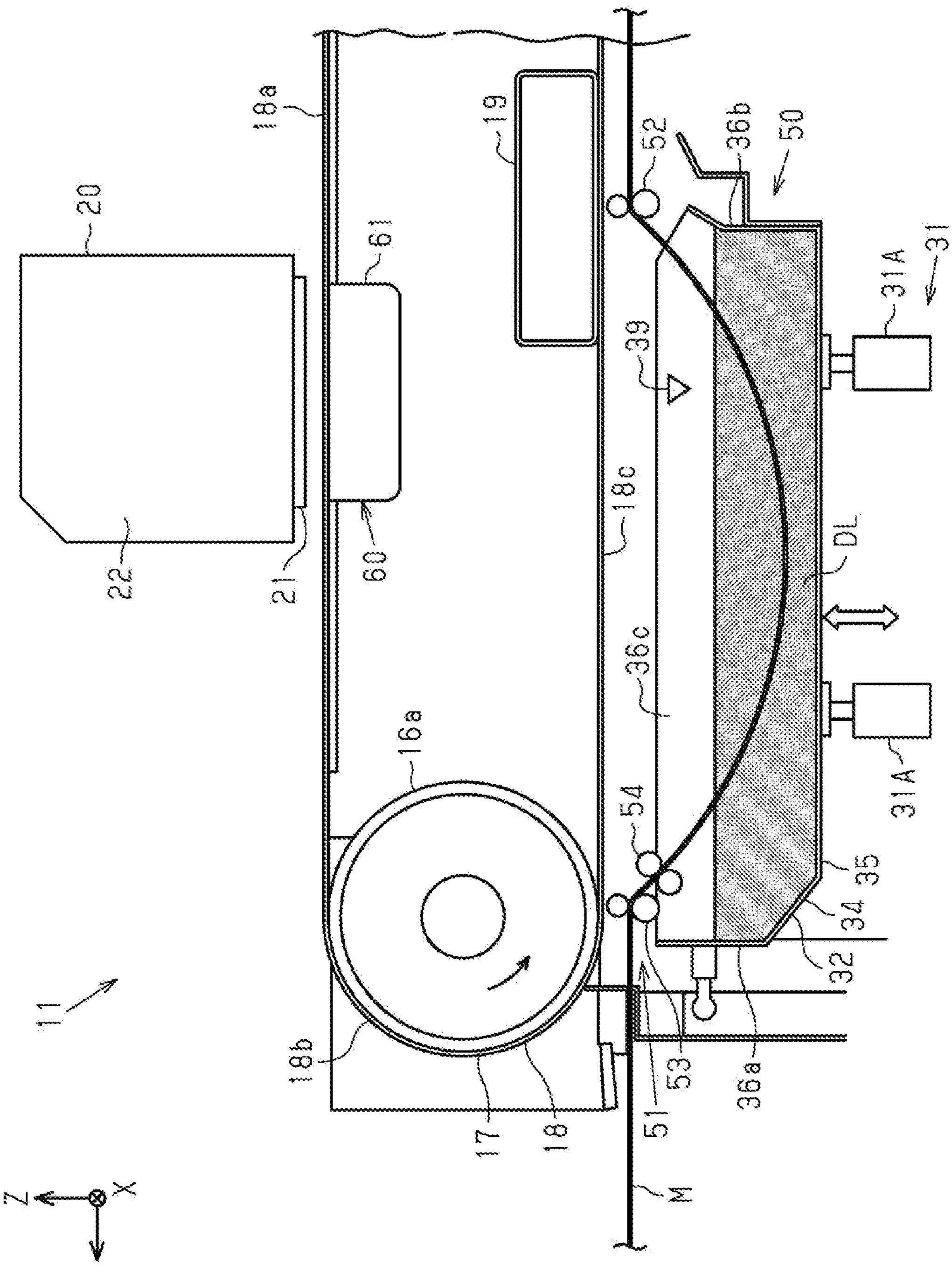
FIG. 5 is a schematic side cross-sectional view illustrating the dyeing unit.

Next, the dyeing unit 50 will be described in detail with reference to FIG. 5. As illustrated in FIG. 5, the dyeing unit 50 includes the cleaning liquid storage unit 32 that stores the dyeing liquid DL instead of the cleaning liquid CL, the elevator mechanism 31 described above for raising and lowering the storage tank 34 of the cleaning liquid storage unit 32, and a transport mechanism 51 that transports the medium M in a path along which the medium M can be immersed in the dyeing liquid DL stored in the cleaning liquid storage unit 32.

The cleaning liquid storage unit 32 is adjusted by the elevator mechanism 31 to a first position, which is a height position where the cleaning liquid storage unit 32 is disposed during cleaning when the cleaning brush 37 is attached, and a second position, which is lower than the first height position and is a height position where the cleaning liquid storage unit 32 is disposed during dyeing when the transport mechanism 51 is mounted. When the elevator actuator 31A of the elevator mechanism 31 is driven in contraction, the cleaning liquid storage unit 32 is disposed at the second position illustrated in FIG. 5. By disposing the cleaning liquid storage unit 32 at the second position, it is possible to ensure a transport path where the medium M is transported along the lower surface portion 18*c* below the glue belt 17, and it is possible to take a path where the medium M is immersed in the dyeing liquid DL in the cleaning liquid storage unit 32.

The transport mechanism 51 includes a pair of transport rollers 52, 53 disposed at both sides that sandwich a portion of the medium M immersed in the dyeing liquid DL in the cleaning liquid storage unit 32 in the transport direction Y. In other words, the transport mechanism 51 includes a first transport roller pair 52 disposed at a position upstream of the transport direction Y with respect to the cleaning liquid storage unit 32, and a second transport roller pair 53 disposed at a position downstream of the transport direction Y. The first transport roller pair 52 transports the medium M by clamping an upstream portion of the medium M in the transport direction Y with respect to a portion immersed in the dyeing liquid DL in the cleaning liquid storage unit 32. The second transport roller pair 53 transports the medium M by clamping a downstream portion of the medium M in the transport direction Y with respect to a portion immersed in the dyeing liquid DL in the cleaning liquid storage unit 32.

The transport mechanism 51 includes a squeeze roller 54 at a position slightly upstream of the second transport roller pair 53. The squeeze roller 54 removes excess dyeing liquid DL from the medium M by sandwiching a portion of the medium M exiting from the dyeing liquid DL in the cleaning liquid storage unit 32. The dyeing liquid DL removed from the medium M by the squeeze roller 54 is returned to the storage tank 34 and then reused.

The control unit 26 drives the pair of transport rollers 52, 53 at the same speed while maintaining a portion of the medium M that hangs between the pair of transport rollers 52, 53 immersed in the dyeing liquid DL, the portion being sandwiched by each pair of transport rollers 52, 53 that constitute the transport mechanism 51. Further, the control unit 26 drives the squeeze roller 54 constituting the transport mechanism 51 at the same transport speed as the pair of transport rollers 52, 53. In addition, when it is detected that the liquid volume of the dyeing liquid DL in the cleaning liquid storage unit 32 is below the lower liquid volume by the liquid volume sensor 39, the control unit 26 replenishes the dyeing liquid DL or notifies the user of information indicating that the dyeing liquid is insufficient.

Figure 6:
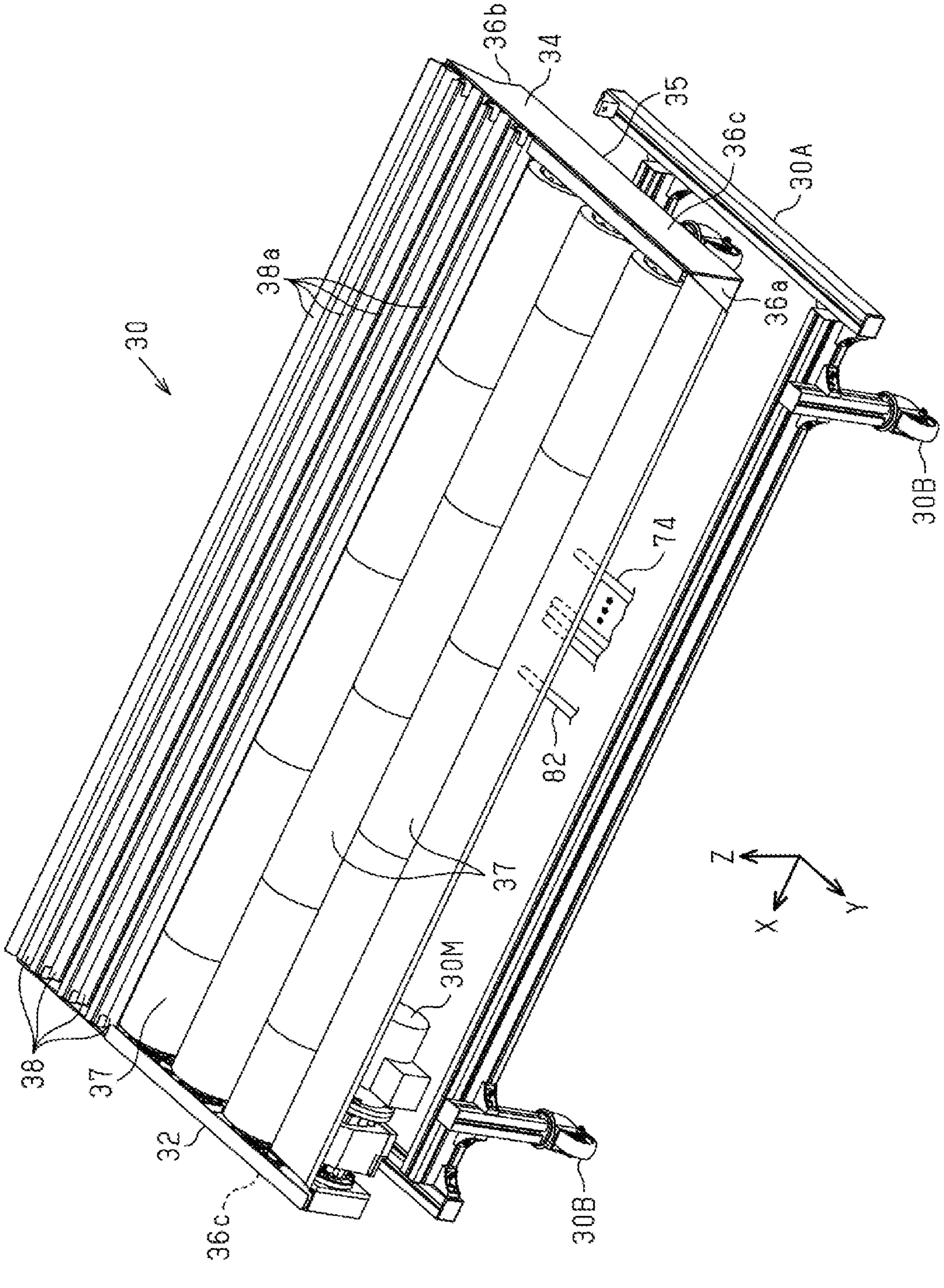
FIG. 6 is a perspective view illustrating the cleaning unit.

As illustrated in FIG. 6, the cleaning unit 30 is supported with regard to a bogie 30A including a plurality of wheels 30B so as to be raised and lowered via the aforementioned elevator mechanism 31 on an upper side thereof. A plurality of the cleaning brushes 37 arranged in the transport direction Y have a width dimension close to the width dimension between the inner walls facing the width direction X of the storage tank 34. The cleaning brush 37 is capable of cleaning the entire width of the lower surface portion 18*c* (see FIGS. 2 and 4) of the glue belt 17. Disposed on the side of the storage tank 34 is the motor 30M that serves as a driving source for the cleaning brush 37. Furthermore, a plurality of the squeegees 38 arranged in the transport direction Y have a width dimension close to the width dimension between the inner walls facing the width direction X of the storage tank 34. The plurality of squeegees 38 can press the entire width of the surface 18 (see FIGS. 2 and 4) of the glue belt 17 with a blade 38*a* of the tip portion to scrape off the cleaning liquid CL remaining at the surface 18 of the glue belt 17. In addition, one single pipe path 82 (supply flow path) and a plurality of pipe paths 74 (supply flow paths) are coupled near the center of the width of the front wall 36*a* of the storage tank 34. The one pipe path 82 is a cleaning liquid supply pipe for supplying the cleaning liquid CL to the storage tank 34.

Figure 7:
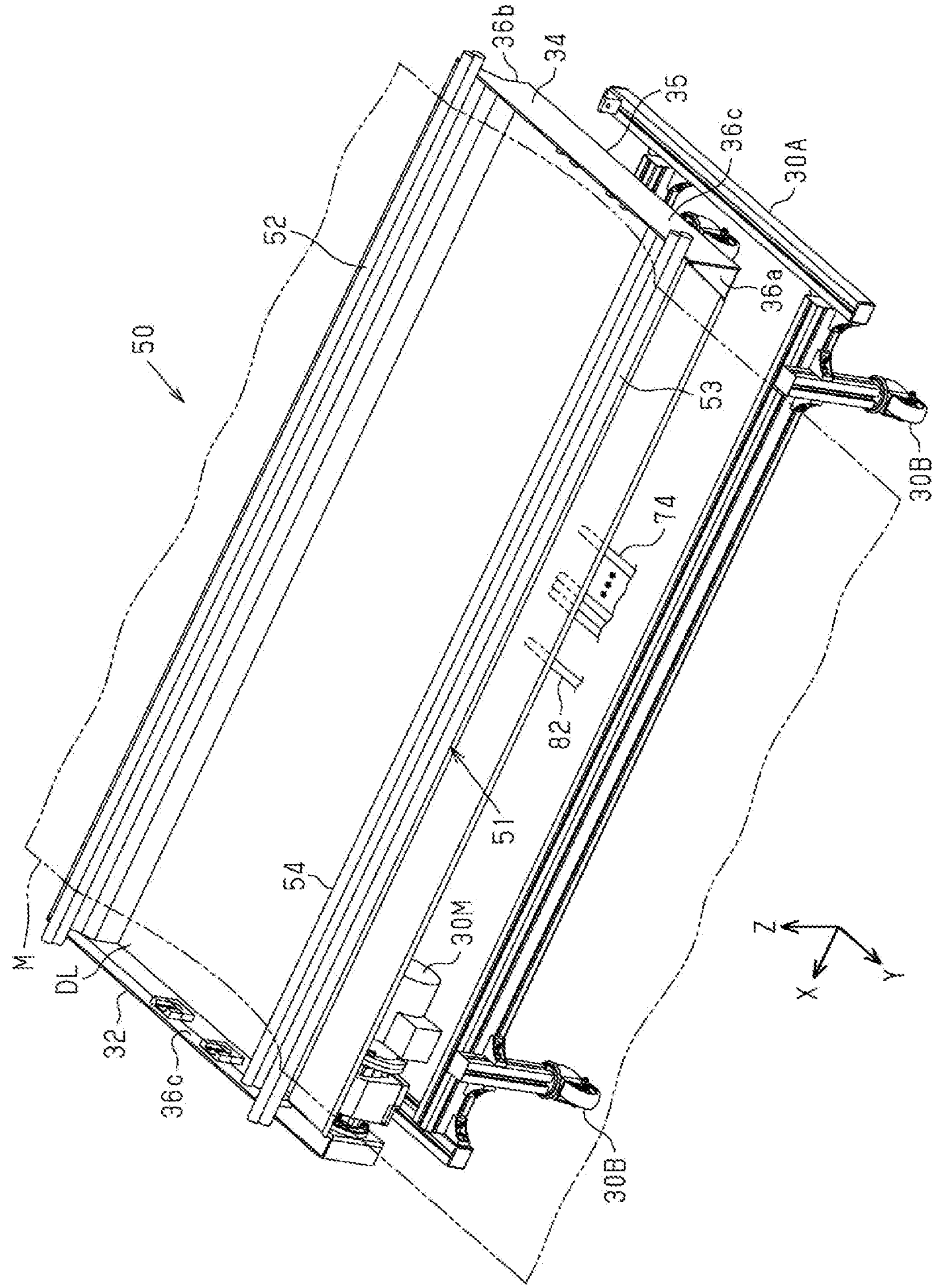
FIG. 7 is a perspective view illustrating the dyeing unit.

As illustrated in FIG. 7, the dyeing unit 50 is supported on the upper side of the bogie 30A via the elevator mechanism 31. The pair of transport rollers 52, 53 disposed on the upstream and the downstream in the transport direction Y with respect to the storage tank 34 have a width dimension close to the width dimension in the width direction X of the storage tank 34, and can clamp and transport, over the entire width, the medium M having the maximum assumed width. Additionally, the squeeze roller 54 has a width dimension approximately equal to the width of each transport roller pair 52, 53, and can remove excess dyeing liquid by clamping, over the entire width, the medium M having the maximum assumed width. Furthermore, the dyeing liquid DL having each color can be supplied to the storage tank 34 from a plurality of pipe paths 74 coupled near the center of the width of the front wall 36*a* of the storage tank 34. In particular, the plurality of pipe paths 74 include a dyeing liquid supply pipe for supplying the dyeing liquid DL to the storage tank 34. The plurality of pipe paths 74 include N pipe paths 74 having the same number of ink colors as the number of the plurality of ink storage units 40A, the same number of pipe paths 74 as the number of the pre-treatment agent storage units 40B, and the same number of pipe paths 74 as the number of the post-processing agent storage units 40C. The cleaning liquid storage unit 32 is capable of supplying not only the dyeing liquid DL, but also the pre-treatment agent and the post-treatment agent, through the plurality of pipe paths 74.

Next, a liquid supply system of the liquid ejecting unit 20 and a dyeing liquid supply system of the dyeing unit 50 will be described with reference to FIG. 8. Note that FIG. 8 illustrates the liquid supply system and the dyeing liquid supply system only for one type of liquid among a plurality of types of liquid including the ink having N colors, the pre-treatment agent, and the post-treatment agent.

Figure 8:
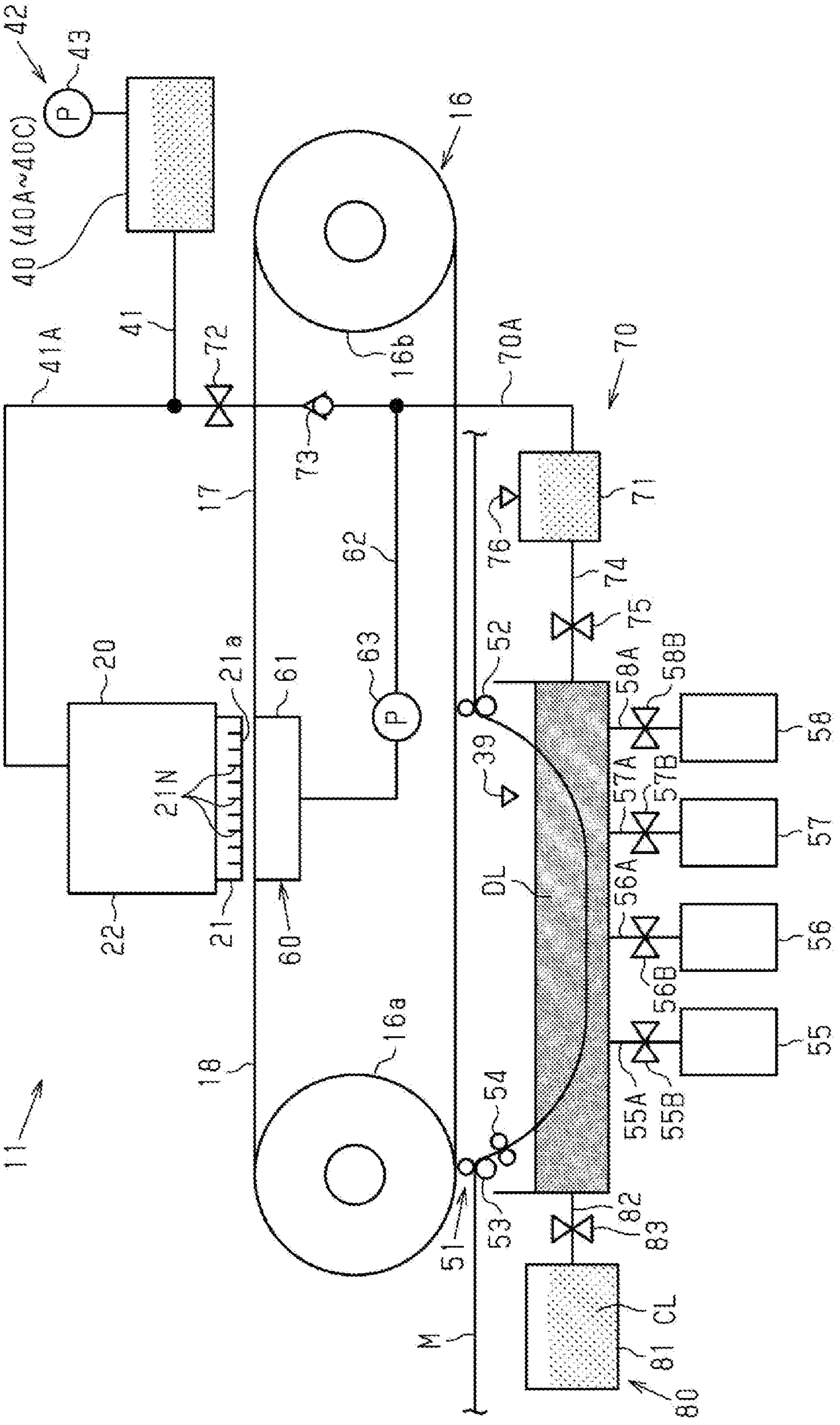
FIG. 8 is a circuit diagram illustrating a liquid ejecting unit and a liquid supply system of the dyeing unit in the printing apparatus.

As illustrated in FIG. 8, the printing apparatus 11 includes a pressurizing mechanism 42 that pressurizes and feeds the liquid stored in the liquid storage unit 40. The pressurizing mechanism 42 includes a pressurizing pump 43 that pressurizes the liquid of the liquid storage unit 40. The pressurizing pump 43 is driven to pressurize the liquid storage unit 40 to supply the liquid to the liquid ejecting unit 20. The liquid ejecting head 21 includes a plurality of nozzles 21N that are open to a nozzle surface 21*a*, which is a surface facing the transport path of the medium M. The liquid ejecting unit 20 performs printing on the medium M by ejecting liquid the from the nozzle 21N of the liquid ejecting head 21.

As illustrated in FIG. 8, the printing apparatus 11 includes the aforementioned maintenance unit 60 that performs maintenance on the liquid ejecting head 21. The maintenance unit 60 performs maintenance operation such as capping, flushing, cleaning, etc. in order to prevent or eliminate a eject defect caused by clogging of the nozzle 21N of the liquid ejecting head 21, or adhesion of foreign matters. The maintenance unit 60 is controlled by the control unit 26.

The maintenance unit 60 includes a cap 61 as an example of a liquid receiving unit that receives liquid discharged as waste liquid from the liquid ejecting head 21 by maintenance operation. During flushing, liquid is ejected from the nozzle 21N of the liquid ejecting unit 20 toward the cap 61 as waste liquid. During cleaning, liquid is discharged from the nozzle 21N of the liquid ejecting unit 20 toward the cap 61 as waste liquid. Note that the liquid ejecting unit 20 may include a flushing box dedicated to flushing that receives the liquid ejected by flushing. In this manner, the liquid receiving unit may be constituted only by the cap 61, or may be constituted by the cap 61 and the flushing box.

The maintenance unit 60 performs maintenance on the nozzle 21N of the liquid ejecting unit 20. As one of the maintenance, the liquid ejecting unit 20 performs flushing to eject liquid from the nozzle 21N as waste liquid. As one of the maintenance, cleaning is performed in which liquid in the liquid ejecting head 21 is discharged as waste liquid through the nozzle 21N.

Here, "capping" refers to operation in which the cap 61 comes into contact with the liquid ejecting head 21 so as to surround the opening of the nozzle 21N when the liquid ejecting head 21 does not eject liquid. As a result, a substantially closed space is formed between the nozzle opening surface where the nozzle 21N of the liquid ejecting head 21 is open and the cap. Thickening of the liquid in the nozzle 21N is suppressed by the capping, whereby the occurrence of eject defect can be prevented.

The "flushing" refers to ejecting operation in which a liquid droplet unrelated to the recording is discharged from the nozzle 21N as waste liquid. The flushing prevents clogging of the nozzle 21N by discharging thickened liquid, bubbles, or foreign matters that cause the eject defect from the nozzle 21N. The flushing is performed, for example, by the liquid ejecting head 21 ejecting the liquid droplet from the nozzle 21N into the cap 61 as waste liquid.

The maintenance unit 60 has a waste liquid feed flow path 62 that is a flow path coupled between the cap 61 and a dyeing liquid supply flow path 70A, and a waste liquid feed pump 63 provided in the middle of the waste liquid feed flow path 62. The waste liquid feed pump 63 feeds the waste liquid from the cap 61 towards the dyeing liquid storage unit 71 through the waste liquid feed flow path 62. Also, in a case of a configuration including the flushing box, the waste liquid is transferred from the flushing box toward the dyeing liquid storage unit 71 by the waste liquid feed pump 63. Note that the waste liquid feed pump 63 coupled to the cap 61 and the waste liquid feed pump 63 coupled to the flushing box may be supply pumps or separate pumps.

The cleaning refers to operation in which liquid is forcibly discharged as waste liquid from the nozzle 21N of the liquid ejecting head 21. The cap 61 is raised and lowered between a capping position at which the nozzle 21N comes into contact with the opening nozzle surface 21*a* and a retracted position separated from the nozzle surface 21*a*. During cleaning, the cap 61 is brought into a capping state in which the cap 61 comes into contact with the nozzle surface 21*a*. In this state, suction cleaning is performed in which negative pressure is generated in the closed space by driving the waste liquid feed pump 63, and the liquid in the liquid ejecting head 21 is discharged as waste liquid through the nozzle 21N. Note that the cleaning may be pressurized cleaning instead of the suction cleaning. In the pressurized cleaning, a pressing force is applied from the upstream of the nozzle 21N of the liquid ejecting head 21, so that the liquid is forcibly discharged as waste liquid from the nozzle 21N. This pressurized cleaning may utilize the pressurizing mechanism 42 to pressurize the liquid storage unit 40 with the pressurizing pump 43 to forcibly discharge the liquid from the nozzle 21N of the liquid ejecting unit 20.

As illustrated in FIG. 8, the printing apparatus 11 includes a dyeing liquid supply unit 70 that supplies the dyeing liquid used by the dyeing unit 50. The printing apparatus 11 includes the dyeing liquid storage unit 71 in which the dyeing liquid DL is temporarily stored before being supplied to the storage tank 34. In the dyeing liquid supply unit 70, the maintenance unit 60 performs the maintenance operation, and the cap 61 receives the waste liquid (ink) ejected or discharged from the nozzle 21N of the liquid ejecting head 21, then the received waste liquid (ink) is collected for each color. The dyeing liquid supply unit 70 stores the ink collected for each color in a plurality of (N) dyeing liquid storage units 71 as dyeing liquid.

The liquids having a plurality of colors are combined and used as at least part of the dyeing liquid. The plurality of (N) dyeing liquid storage units 71, which are the same number as the number of colors, are coupled to the storage tank 34 through a plurality of (N) pipe paths 74. An open/close valve 75 capable of individually opening and closing the pipe path 74 is provided in the middle of the plurality of (N) pipe paths 74. The dyeing liquid stored for each color in the dyeing liquid storage unit 71 is supplied to the storage tank 34 by opening the open/close valve 75. When the dyeing liquid DL having the plurality of colors is supplied to the storage tank 34, the dyeing liquid DL having the plurality of colors is toned in the storage tank 34. In the present example, the maintenance unit 60 performs the maintenance operation, and the liquids having the plurality of colors ejected or discharged as waste liquid from the liquid ejecting head 21 are combined in the storage tank 34, so that the combined liquid is at least used as part of the dyeing liquid DL. In a case where the dyeing liquid is insufficient only with the liquids having the plurality of colors ejected or discharged from the liquid ejecting head 21 in the maintenance operation, the liquid from the liquid storage unit 40 is replenished.

The supply flow path 41 extending from the liquid storage unit 40 branches into a supply flow path 41A coupled to the liquid ejecting unit 20 and the dyeing liquid supply flow path 70A coupled to the dyeing liquid storage unit 71. The dyeing liquid storage unit 71 stores the dyeing liquid supplied to the storage tank 34 when dyeing is performed.

The waste liquid feed flow path 62 extending from the maintenance unit 60 is merged with the dyeing liquid supply flow path 70A. The ink received as waste liquid by the cap 61 of the maintenance unit 60 is supplied to the dyeing liquid storage unit 71 through the waste liquid feed flow path 62 and the dyeing liquid supply flow path 70A.

Liquid discharged by the maintenance operation of the liquid ejecting unit 20 is at least used as part of the dyeing liquid. When the dyeing liquid of the dyeing liquid storage unit 71 is insufficient, the liquid from the liquid storage unit 40 may be replenished as dyeing liquid. Between the liquid storage unit 40 and the dyeing liquid storage unit 71, an open/close valve 72 and a check valve 73 are provided in the middle of the dyeing liquid supply flow path 70A that is branched from the supply flow path 41. The check valve 73 permits liquid to flow from the liquid storage unit 40 to the dyeing liquid storage unit 71, and prevents liquid from flowing to the opposite orientation thereof.

The dyeing unit 50 includes a liquid volume sensor 76 that detects the liquid volume of the dyeing liquid DL stored in the dyeing liquid storage unit 71. The liquid volume sensor 76 detects the insufficiency of the dyeing liquid. The open/close valve 72 is opened when the liquid volume detected by the liquid volume sensor 76 is less than the predetermined lower limit value of the liquid volume, and is closed when the predetermined liquid volume upper limit value is reached. Thus, the required amount of the dyeing liquid DL for each color is stored in the dyeing liquid storage unit 71. Note that the printing apparatus 11 may include a dyeing liquid supply source dedicated to the dyeing liquid (a dyeing liquid supply tank), in addition to the liquid storage unit for storing the liquid to be supplied to the liquid ejecting unit 20. That is, a toning storage unit may be provided for storing the dyeing liquid DL having at least part of the selected colors of the dyeing liquid DL having the plurality of colors stored in the plurality of dyeing liquid storage units 71, and performing the toning. Furthermore, a configuration may be adopted wherein in a case where the liquid volume of the dyeing liquid storage unit 71 is insufficient even when using the waste liquid, the dyeing liquid may be supplied from the dyeing liquid supply source. Furthermore, when the dyeing liquid from the dyeing liquid supply source is also insufficient, the ink may be supplied from the ink storage unit 40A.

Configuration of Dyeing Unit

As illustrated in FIG. 8, the dyeing unit 50 includes a storage tank 34 shared with the cleaning unit 30, the dyeing liquid supply unit 70 that supplies the dyeing liquid DL to the storage tank 34, and the transport mechanism 51 that transports the medium M for dyeing. The transport mechanism 51 includes the pair of transport rollers 52, 53 and the squeeze roller 54 described above.

Further, a first holding tank 55 that discharges and holds the stored cleaning liquid CL is coupled to the storage tank 34. The first holding tank 55 is a tank for holding the cleaning liquid CL temporarily discharged from the storage tank 34 when the liquid stored in the storage tank 34 is switched from the cleaning liquid CL to the dyeing liquid DL.

When the dyeing unit 50 performs dyeing, the dyeing liquid DL is stored in the storage tank 34 instead of the cleaning liquid CL. A drainage flow path 55A for discharging the cleaning liquid CL is coupled to the storage tank 34. A drainage valve 55B is provided in the middle of the drainage flow path 55A, and the cleaning liquid CL in the storage tank 34 is discharged to the first holding tank 55 through the drainage flow path 55A by opening the drainage valve 55B. In an example illustrated in FIG. 8, a discharge port of the drainage flow path 55A is coupled to the first holding tank 55. Note that the configuration may be adopted in which the first holding tank 55 is eliminated and the cleaning liquid CL is discharged from the tank prepared by an operator.

Further, a second holding tank 56 that discharges and holds the stored dyeing liquid DL is coupled to the storage tank 34. The second holding tank 56 is a tank for holding the dyeing liquid DL temporarily discharged from the storage tank 34 when the liquid stored in the storage tank 34 is switched from the dyeing liquid DL to another liquid such as cleaning liquid CL. A drainage flow path 56A for discharging the dyeing liquid DL is coupled to the storage tank 34. A drainage valve 56B is provided in the middle of the drainage flow path 56A, and the dyeing liquid DL in the storage tank 34 is discharged to the second holding tank 56 through the drainage flow path 56A by opening the drainage valve 56B. In the example illustrated in FIG. 8, a discharge port of the drainage flow path 56A is coupled to the second holding tank 56.

By immersing the medium M in the liquid stored in the storage tank 34, the dyeing unit 50 performs treatment to attach the component of the liquid to the medium M. Furthermore, the dyeing unit 50 performs dyeing treatment by immersing the medium M in the dyeing liquid DL stored in the storage tank 34 so as to attach the dye, which is a component of the dyeing liquid, to the medium M.

The dyeing unit 50 may handle not only the dyeing liquid DL but also a pre-treatment agent L1 and a post-treatment agent L2 as the liquid for immersing the medium M. The pre-treatment agent L1 is treatment liquid for pre-treating the medium M by immersing the medium M in advance before the liquid ejecting unit 20 performs printing. The pre-treatment agent L1 may be, for example, an anti-bleeding agent. In this case, the surface of the medium M is subjected to the pre-treatment agent L1 prior to printing on the medium M in order to prevent bleeding of the ink ejected onto the medium M by the liquid ejecting unit 20 when printing. When the dyeing unit 50 performs pre-treatment, the medium M is immersed in the pre-treatment agent L1 stored in the storage tank 34. By applying the pre-treatment agent L1 to the surface of the medium M prior to printing, the surface of the medium M is subjected to the anti-bleeding treatment. Note that the pre-treatment agent L1 is not limited to the anti-bleeding agent, but may be treatment liquid applied to the medium M prior to printing.

In addition, the post-treatment agent L2 is applied to the surface of the medium M after printing in order to prevent the layer of ink (hereinafter, also referred to as "ink layer") printed onto the medium M by the liquid ejecting unit 20 from being peeled off after drying by an external force such as friction. When the dyeing unit 50 performs post-treatment, the medium M is immersed in the post-treatment agent L2 stored in the storage tank 34. The post-treatment agent L2 may be, for example, a coating agent. By immersing the medium M in the coating agent, the ink layer of the medium M after printing is protected by the coating layer. Note that the post-treatment agent L2 is not limited to the coating agent, but may be treatment liquid applied to the medium M after printing.

As illustrated in FIG. 8, the dyeing unit 50 may include a third holding tank 57 that discharges and temporarily holds the pre-treatment agent L1 stored in the storage tank 34 from the storage tank 34. The pre-treatment agent L1 stored in the storage tank 34 is discharged and temporarily stored in the third holding tank 57, so that when the liquid to be stored next, such as cleaning liquid CL, is stored in the storage tank 34, the pre-treatment agent L1 does not have to be discarded. A drainage flow path 57A for discharging the pre-treatment agent L1 is coupled to the storage tank 34. A drainage valve 57B is provided in the middle of the drainage flow path 57A, and the pre-treatment agent L1 in the storage tank 34 is discharged to the third holding tank 57 through the drainage flow path 57A by opening the drainage valve 57B.

Furthermore, as illustrated in FIG. 8, the dyeing unit 50 may include a fourth holding tank 58 that discharges and temporarily holds the post-treatment agent L2 stored in the storage tank 34 from the storage tank 34. The post-treatment agent L2 stored in the storage tank 34 is discharged and temporarily stored in the fourth holding tank 58, so that when the liquid to be stored next, such as cleaning liquid CL, is stored in the storage tank 34, the post-treatment agent L2 is not discarded. A drainage flow path 58A for discharging the post-treatment agent L2 is coupled to the storage tank 34. A drainage valve 58B is provided in the middle of the drainage flow path 58A, and the post treatment agent L2 in the storage tank 34 is discharged to the fourth holding tank 58 through the drainage flow path 58A by opening the drainage valve 58B.

The printing apparatus 11 may include the liquid volume sensor 39 for detecting the position of the liquid level of the liquid such as the cleaning liquid CL or the dyeing liquid DL in the storage tank 34. For example, when the liquid volume sensor 39 detects that the height of the liquid level of the storage tank 34 has been lowered to a predetermined position by evaporation of the water contained in the cleaning liquid CL, a message may be displayed in the display unit 46 illustrated in FIG. 1, which facilitates the replenishment of the cleaning liquid CL into the storage tank 34.

As illustrated in FIG. 8, the cleaning unit 30 includes a cleaning liquid storage unit 80 for storing the cleaning liquid. The cleaning liquid storage unit 80 includes a cleaning liquid tank 81. The cleaning liquid tank 81 and the cleaning liquid storage unit 32 are coupled through a pipe path 82 for supplying the cleaning liquid CL. An open/close valve 83 is provided in the middle of the pipe path 82, and the cleaning liquid CL in the cleaning liquid tank 81 is supplied to the cleaning liquid storage unit 32 through the pipe path 82 by opening the open/close valve 83. Note that a pump may be provided that supplies the cleaning liquid CL in the cleaning liquid tank 81 to the storage tank 34.

The control unit 26 is configured to include a CPU and a memory (not illustrated). The CPU is an arithmetic processing unit. The memory is a storage device ensuring a region for storing programs of the CPU, a working region, etc. and includes a storage element such as a RAM, EEPROM, etc. The CPU controls operation of each portion of the printing apparatus 11 in accordance with a program stored in the memory. The control unit 26 performs wired or wireless communication with the control unit (not illustrated) of the drying mechanism 100 and shares information with each other.

The control unit 26 controls the transport unit 16, the liquid ejecting unit 20, the cleaning unit 30, and the dyeing unit 50 based on the printing data. The printing data includes a command, and printed image data. The command includes a scan command for driving and controlling the carriage 22, a transport command for controlling the glue belt 17, etc. The control unit 26 drives and controls the carriage 22 based on the scan command, and controls transport of the glue belt 17, etc. based on the transport command.

The printed image data is dot data having a predetermined gradation. In the present example, the data is, for example, four-graduation dot data. The printed image data is configured by a plurality of plate data represented by dot data for each ink color. The liquid ejecting head 21 can distinguish the liquid droplets separately depending on whether or not the droplets are to be ejected, and can distinguish the liquid droplets separately in three gradations of dot size, for example, large dots, medium dots, and small dots, as the droplet size when ejected. Note that the graduation of the printed image data may have two graduations with only the presence or absence of ejecting, or three graduations for distinguishing large dots and small dots. The control unit 26 controls a duty value that determines the magnitude of the power supplied to a eject drive element contained in each nozzle of the liquid ejecting head 21. In other words, the control unit 26 performs liquid eject control in which the liquid droplets are ejected from the nozzle by duty-controlling the eject drive element for each nozzle of the liquid ejecting head 21 based on a pixel value of the printed image data.

The control unit 26 receives color information of the dyeing liquid from the operation unit 45 operated by the user. Tone table data is stored in a non-volatile memory (not illustrated) included in the control unit 26. The control unit 26 refers to the tone table data (not illustrated) based on the color information of the dyeing liquid received from the operation unit 45, and determines the ink supply amount to be supplied to the storage tank 34 from the plurality of dyeing liquid storage units 71 for each color. Then, the control unit 26 supplies the required ink supply amount of ink to the storage tank 34 by controlling the opening and closing of the open/close valve 75 for each color. Thus, the dyeing liquid DL for the required color is supplied from each of the dyeing liquid storage units 71 to the storage tank 34 at the required proportion. As a result, the color specified by the user with the operation of the operation unit 45 is toned by the dyeing liquid DL in the storage tank 34. Thus, the user can omit manual toning operation.

The N pipe paths 74 respectively supplying the dyeing liquid DL having N colors are coupled to the front wall 36*a* of the storage tank 34 and communicate with the storage tank 34 (see FIG. 7). By opening and closing the N open/close valves 75, the required color of the dyeing liquid DL is supplied to the storage tank 34 from the N dyeing liquid storage units 71, which are the same number as the ink color number N. In addition, one pipe path 82 is coupled to the front wall 36*a* of the storage tank 34 and communicates with the storage tank 34 (see FIG. 6). Note that the one pipe path 82 and the N pipe paths 74 may be coupled to any surface of the storage tank 34, may be coupled to the rear wall 36*b*, or may be divided into and coupled to a plurality of surfaces.

Next, digital printing and analog printing of the printing apparatus 11 will be described with reference to FIGS. 9 to 11.

Figure 9:
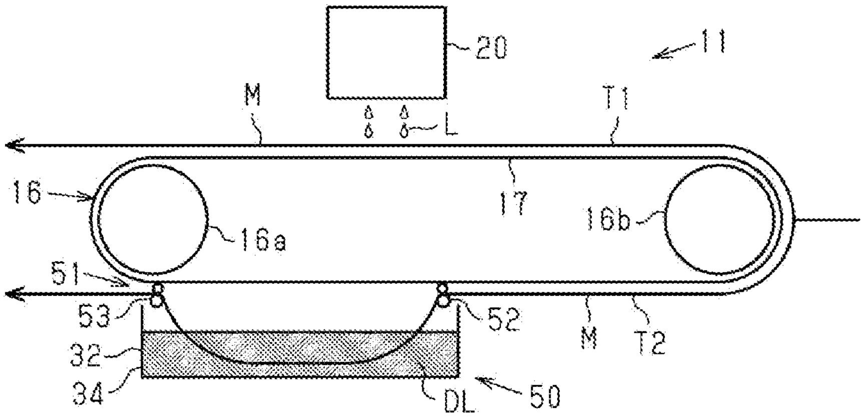
FIG. 9 is a schematic side cross-sectional view illustrating a printing apparatus for describing a transport path when printing and dyeing.

As illustrated in FIG. 9, the printing apparatus 11 includes, as transport paths for transporting the medium M, a first transport path T1 for transporting the medium M by the glue belt 17 when the liquid ejecting unit 20 ejects liquid L, and a second transport path T2 for transporting the medium M in a path extending through the cleaning liquid storage unit 32 and below the glue belt 17.

Figure 10:
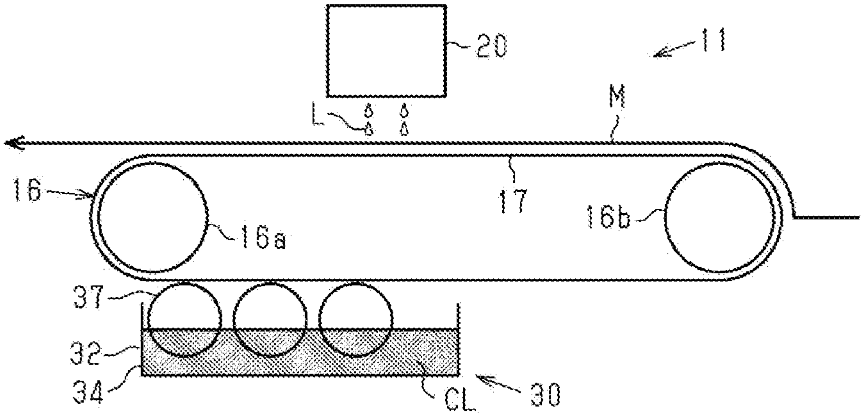
FIG. 10 is a schematic side cross-sectional view illustrating the printing apparatus in a printing process.

As illustrated in FIG. 10, when the digital printing is performed in which the liquid ejecting unit 20 ejects the liquid L, the medium M is transported by the glue belt 17. At this time, the cleaning liquid CL stored in the cleaning liquid storage unit 32 is used for cleaning the glue belt 17 by the cleaning brush 37.

Figure 11:
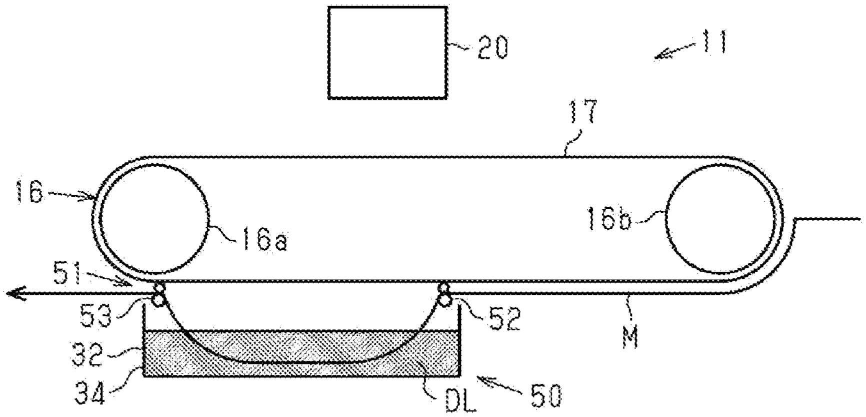
FIG. 11 is a schematic side cross-sectional view illustrating the printing apparatus in a dyeing process.

Furthermore, as illustrated in FIG. 11, when the analog printing is performed in which the dyeing unit 50 performs dyeing by immersing the medium M in the dyeing liquid DL in the cleaning liquid storage unit 32, the medium M is transported by the transport mechanism 51 in a path extending below the glue belt 17. At this time, the dyeing unit 50 performs dyeing on the medium M by continuously immersing the medium M during the transport in the dyeing liquid DL stored in the cleaning liquid storage unit 32.

For this reason, the printing apparatus 11 can perform the digital printing and analog printing on the medium M in a single apparatus. In addition, it is possible to appropriately select which of the digital printing and the analog printing is to be performed on the medium M.

Next, action of the printing apparatus 11 will be described.

The printing system 10 and the printing apparatus 11 according to the present exemplary embodiment perform printing (digital printing) by the inkjet type liquid ejecting unit 20 and dyeing (analog printing) by the dyeing unit 50 on the medium M. Here, the digital printing is a digital process for printing at least a portion of the medium M by digital processing that controls at least a dot position between a position (dot position) and a dot size, the dot being landed by ejecting liquid such as ink based on the printed image data (digital data). On the other hand, the analog printing is an analog process in which the medium M is immersed in the dyeing liquid and then the dyeing is performed.

The printing apparatus 11 is capable of ejecting liquid and performing a plurality of types (four types in the present example) of printing:

(1) printing is performed with a dye extracting step of ejecting the dye extracting agent as the post-treatment agent L2;

(2) printing is performed with a dye preventing step of ejecting the dye preventing agent as the pre-treatment agent L1;

(3) printing is performed with a pre-treatment step of immersing the material in an anti-bleeding agent as the pre-treatment agent L3; and (4) printing is performed with a post-treatment step of immersing the material in a coating agent as the post-treatment agent L4.

Note that printing can also be performed by combining the aforementioned (1) or (2) and the aforementioned (3) or (4).

The printing methods of (1) to (4) described above will be described in order below.

Figure 22:
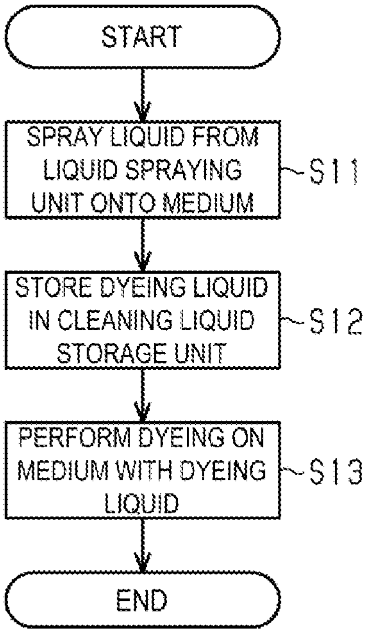
FIG. 22 is a flowchart illustrating a first printing method in which the process of the liquid ejecting unit is performed prior to the process of the dyeing unit.
Figure 23:
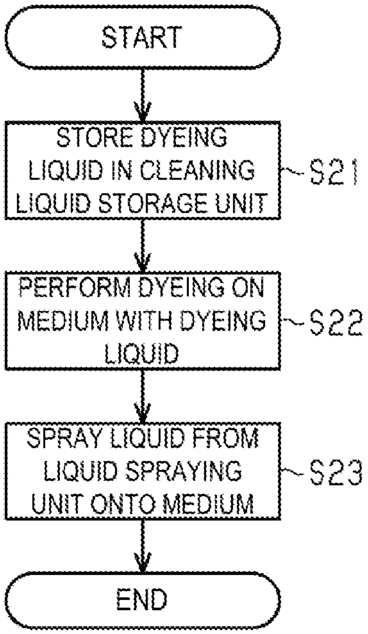
FIG. 23 is a flowchart illustrating a second printing method in which the process of the liquid ejecting unit is performed after the process of the dyeing unit.

The printing method according to the present exemplary embodiment mainly includes a first printing process method illustrated in FIG. 22 and a second printing process method illustrated in FIG. 23. These two methods differ in the order in which the analog printing and digital printing are performed on the medium M. That is, the first printing process method illustrated in FIG. 22 is a process method for performing the digital printing prior to the analog printing. Furthermore, the second printing process method illustrated in FIG. 23 is a process method for performing the analog printing prior to the digital printing. Hereinafter, the printing processes (1) to (4) above will be described.

Printing with Dye Extracting Step

First, a printing process with the dye extraction will be described with reference to FIGS. 12 to 14. Note that, in the following drawing, the cleaning liquid storage unit 32 that cleans the glue belt 17 is omitted when the liquid ejecting unit 20 performs printing.

Figure 12:
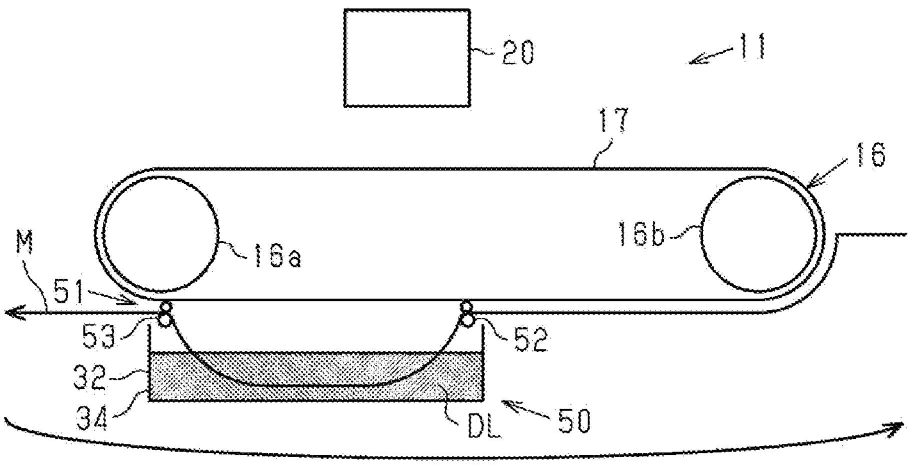
FIG. 12 is a schematic side cross-sectional view illustrating the printing apparatus in a step of dyeing a medium prior to dye extraction.

As illustrated in FIG. 12, first, the medium M is immersed in the dyeing liquid DL and the dyeing is performed. At this time, the user inputs the color to be dyed by the operation of the operation unit 45. The control unit 26 refers to the tone table data based on the color information input by the user, and determines the dyeing liquid for the required color and the mixing ratio thereof. The control unit 26 opens an open/close valve 75 corresponding to the required color among the plurality of open/close valves 75 (FIG. 8), and supplies the amount of dyeing liquid corresponding to the required mixing ratio from the corresponding dyeing liquid storage unit 71 to the storage tank 34. The dyeing liquid DL is toned, which has a color corresponding to the color information input by the user in the operation unit 45. The supply of the dyeing liquid to the storage tank 34 is performed in a state where the cleaning brush 37 is mounted thereto.

Then, after the dyeing liquid is supplied to the storage tank 34, the control unit 26 drives the motor 30M to rotate the cleaning brush 37. The dyeing liquid stored in the storage tank 34 is supplied to the liquid level at which a portion including the lower portion of the cleaning brush 37 is immersed. Thus, rotation of the cleaning brush 37 for a period of time causes the dyeing liquid DL stored in the storage tank 34 to be agitated. As a result, the dyeing liquid DL in the storage tank 34 is toned to a uniform color. After this toning has ended, the user sandwiches, by the pair of transport rollers 52, 53 configuring the transport mechanism 51, the medium M drawn from a supply roll (not illustrated) disposed upstream in the transport direction Y. In addition, the user sets the portion hanging between the pair of transport rollers 52, 53 to a state of being immersed in the dyeing liquid DL.

After this, as illustrated in FIG. 12, the pair of transport rollers 52, 53 is driven so that the medium M is continuously immersed in the dyeing liquid DL and thus dyed to a predetermined color specified by the user. In other words, the analog printing is performed on the medium M. In the analog printing such as dyeing, for example, the background is dyed. For example, when the background is printed the with the digital printing by inkjet recording, banding tends to occur. In contrast, the banding does not occur in the case of the analog printing. The dyed medium M discharged from the storage tank 34 is dried by the drying mechanism 100 (see FIG. 3). The medium M dyed in this manner is wound in a roll form by the winding device (not illustrated). The rolled roll after dyeing is then set as a supply roll.

Figure 13:
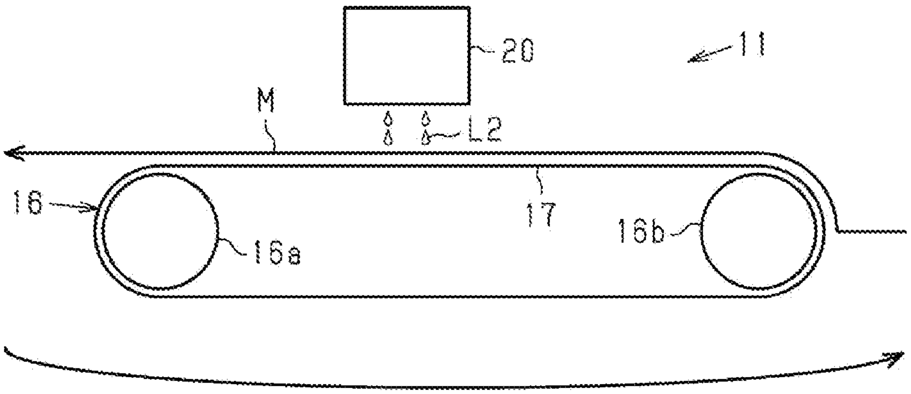
FIG. 13 is a schematic side cross-sectional view illustrating the printing apparatus in a dye extracting process.

As illustrated in FIG. 13, the medium M is transported by the glue belt 17. The liquid ejecting unit 20 ejects the dye extracting agent as the post-treatment agent L2 with respect to the medium M. This ejecting of the post-treatment agent L2 is performed by the digital printing. The dyeing liquid is removed from the portion where the dye extracting agent lands. As a result, for example, delicate lines and patterns in the medium M after dyeing are extracted. Further, the user sets the roll after dye extraction as a supply roll. At this time, a transport mechanism for transporting the roll after the dye extraction may be provided separately.

Figure 14:
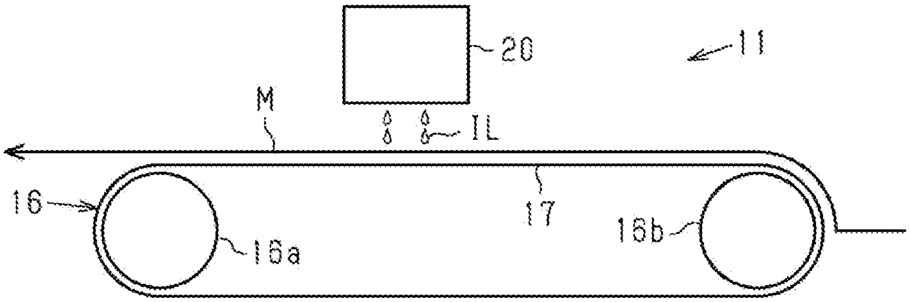
FIG. 14 is a schematic side cross-sectional view illustrating the printing apparatus in a step of printing after the dye extraction.

As illustrated in FIG. 14, the medium M is transported by the glue belt 17. The liquid ejecting unit 20 ejects ink IL to the medium M. The ink IL is printed on the extracted portion of the medium M. As a result, for example, a pattern in a extracted portion, etc. is colored, and a color pattern is printed, for example. Since the background portion of this printed matter is dyed, streaks due to banding are suppressed.

Printing with Dye Preventing Step

Next, a printing process with the dye prevention will be described with reference to FIGS. 15 to 17.

Figure 15:
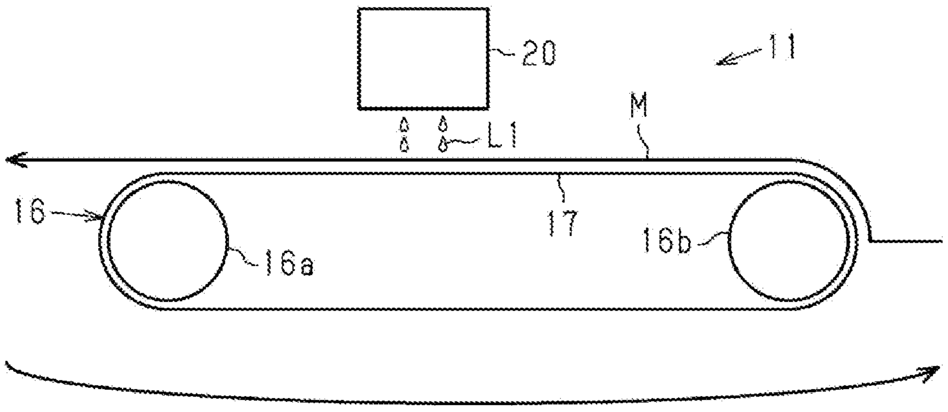
FIG. 15 is a schematic side cross-sectional view illustrating the printing apparatus in a step of printing a dye preventing agent.

As illustrated in FIG. 15, first, the medium M is transported by the glue belt 17. The liquid ejecting unit 20 ejects the pre-treatment agent L1 onto the medium M. The pre-treatment agent L1 is, for example, a dye preventing agent. The dye preventing agent is ejected in advance into a portion of the medium M that is not desired to be dyed. For example, a pattern, etc. is applied to the medium M by the dye preventing agent. The medium M that has undergone the dye prevention is dried by the drying mechanism 100 (see FIG. 2). Thus, the medium M that has undergone the dye prevention is wound in a roll form by the winding device (not illustrated). Next, the roll wound after the dye prevention is set as a supply roll.

Figure 16:
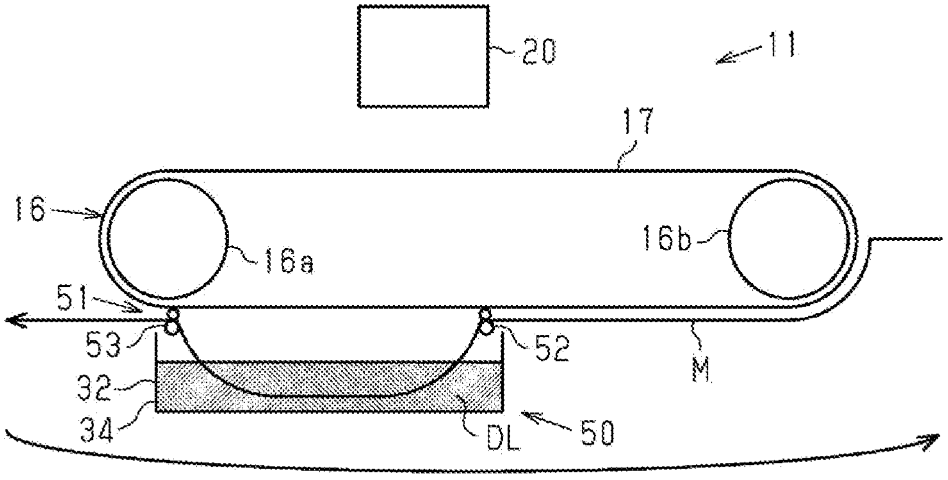
FIG. 16 is a schematic side cross-sectional view illustrating the printing apparatus in a step of dyeing a medium after an dye preventing process.

Next, as illustrated in FIG. 16, the pair of transport rollers 52, 53 is driven so that the medium M is continuously immersed in the dyeing liquid DL. The medium M is dyed to a predetermined color specified by the user. In other words, the analog printing is performed on the medium M. The pattern of the portion to which the dye preventing agent is applied in advance is not dyed by this dyeing. In a case where the background other than the pattern is printed by, for example, the digital printing using an inkjet recording method, the banding is likely to occur. On the other hand, the background other than the pattern is printed by the analog printing, whereby the banding does not occur. In this manner, the medium M exiting from the storage tank 34 after dyeing is dried by the drying mechanism 100 (see FIG. 3) during the winding in a roll form by the winding device. Then, after the dye preventing agent is removed from the medium M, the roll wound after dyeing is set as a supply roll.

Figure 17:
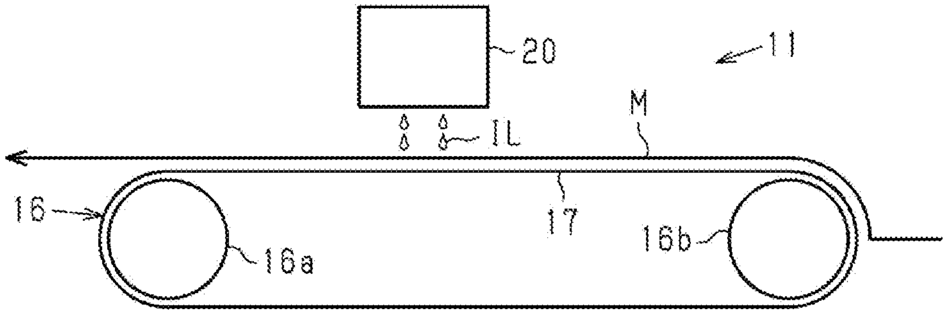
FIG. 17 is a schematic side cross-sectional view illustrating the printing apparatus in a step of printing after dye prevention.

As illustrated in FIG. 17, the medium M after dyeing is transported by the glue belt 17. The liquid ejecting unit 20 ejects the ink IL onto the medium M. The ink IL is ejected into the portion that is not dyed by the dye preventing agent, for example, a color pattern is printed. The medium M at which the pattern, etc. is printed by the digital printing is dried by the drying mechanism 100 (see FIG. 24), and then wound into a roll form by the winding device (not illustrated).

Printing with Pre-Treatment Step

Next, a printing process with the pre-treatment will be described with reference to FIGS. 18 and 19.

When printing is performed by ejecting the ink IL from the liquid ejecting unit 20, the pre-treatment agent L3 is stored in the cleaning liquid storage unit 32 prior to printing. The pre-treatment is performed by immersing the medium M in the pre-treatment agent L3 stored in the cleaning liquid storage unit 32. In other words, prior to ejecting the ink IL from the liquid ejecting unit 20 and printing on the medium M, the medium M is immersed in the pre-treatment agent L3 stored in the cleaning liquid storage unit 32, and the pre-treatment is performed.

Figure 18:
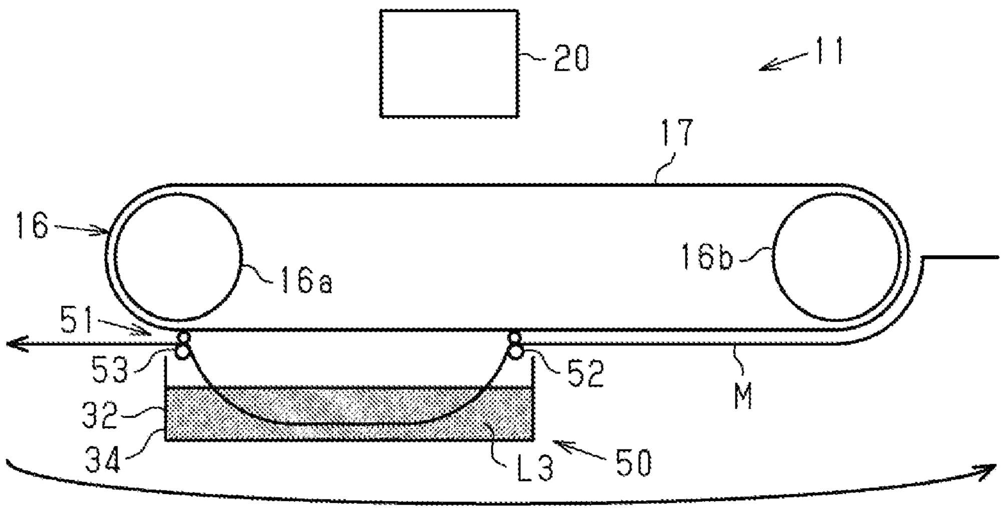
FIG. 18 is a schematic side cross-sectional view illustrating the printing apparatus in a step of performing pre-treatment.

First, as illustrated in FIG. 18, the pre-treatment agent L3 is stored in the cleaning liquid storage unit 32. The medium M is set to a state of being immersed in the pre-treatment agent L3 in the transport mechanism 51. The pair of transport rollers 52, 53 is driven so that the medium M is continuously immersed in the pre-treatment agent L3. The pre-treatment agent L3 is, for example, the anti-bleeding agent. Ejecting the ink IL without pre-treating the medium M may cause the ink IL to bleed. Thus, prior to printing, the medium M is immersed in the pre-treatment agent L3 (the anti-bleeding agent) to provide the anti-bleeding treatment to the medium M. A roll wound while drying the pre-treatment agent L3 is set on the supply side.

Figure 19:
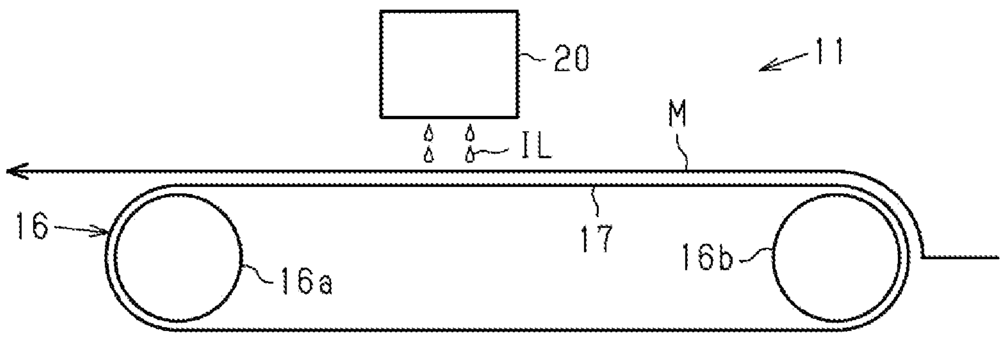
FIG. 19 is a schematic side cross-sectional view illustrating the printing apparatus in a step of printing on a medium after pre-treatment.

Next, as illustrated in FIG. 19, the medium M that has been subjected to the anti-bleeding treatment is transported by the glue belt 17. The liquid ejecting unit 20 ejects the ink IL onto the medium M, which has been subjected to the anti-bleeding treatment. The ink IL is printed onto the medium M without bleeding. The medium M after printing is wound in a roll form while being dried.

Printing with Post-Treatment Step

Next, a printing process with the post-treatment will be described with reference to FIGS. 20 and 21.

When printing is performed by ejecting the ink IL from the liquid ejecting unit 20, the post-treatment is performed by immersing the medium M in the post-treatment agent L4 stored in the cleaning liquid storage unit 32 after printing.

Figure 20:
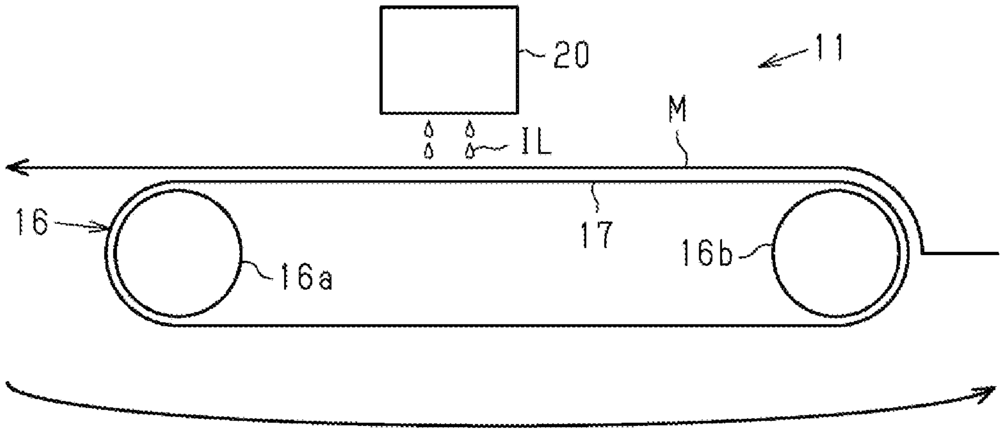
FIG. 20 is a schematic side cross-sectional view illustrating the printing apparatus in a step of printing on a medium before post-processing.

First, as illustrated in FIG. 20, the medium M is transported by the glue belt 17. The printing is performed by the liquid ejecting unit 20 ejecting the ink IL onto the medium M. A roll wound while drying the ink IL is set on the supply side.

Figure 21:
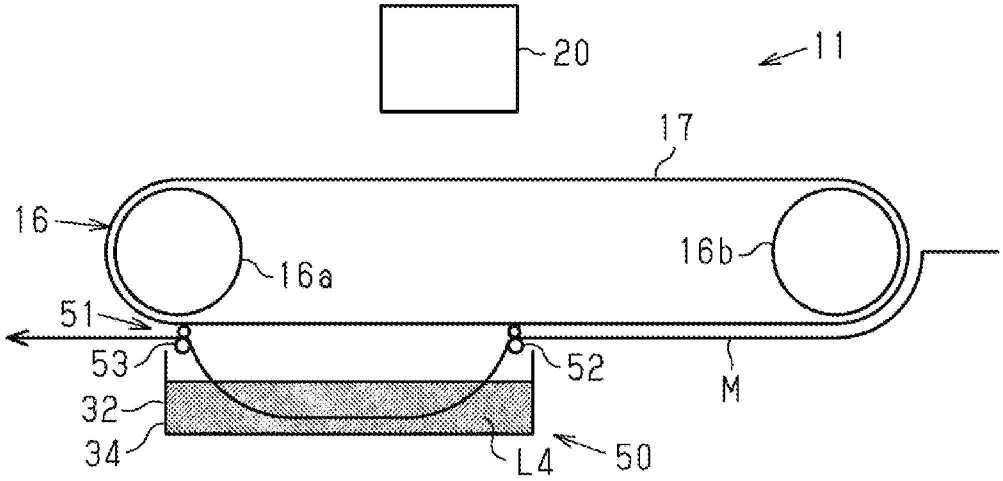
FIG. 21 is a schematic side cross-sectional view illustrating the printing apparatus in a step of performing post-processing after printing.

Next, as illustrated in FIG. 21, the post-treatment agent L4 is stored in the cleaning liquid storage unit 32 instead of the cleaning liquid CL. The transport mechanism 51 is set in a state in which the medium M is immersed in the post-treatment agent L4. The pair of transport rollers 52, 53 is driven so that the medium M is continuously immersed in the post-treatment agent L4. The post-treatment agent L4 stored in the storage tank 34 is, for example, a coating agent. The medium M is wound while drying the coating agent. The ink layer of the medium M after drying is protected by the coating layer. Therefore, even when the medium M is subjected to an external force such as friction, etc., the ink layer will not easily peel off.

Printing Method

Next, the printing method in the printing apparatus will be described with reference to FIGS. 22 and 23. Note that FIG. 22 illustrates a first printing method in which the liquid ejecting unit 20 ejects liquid and then performs dyeing on the medium M with the dyeing liquid. FIG. 23 illustrates a second printing method in which the liquid ejecting unit 20 ejects liquid after the medium M has been dyed with the dyeing liquid. First, the first printing method will be described.

The control unit 26 executes processing of the first printing method illustrated in the flowchart in FIG. 22. In step S11, the control unit 26 ejects the liquid from the liquid ejecting unit onto the medium. Specifically, the control unit 26 drives the motor (not illustrated) to drive the roller 16*a* to rotate and transport the medium M at a predetermined transport speed by the glue belt 17. The liquid ejecting unit 20 performs printing on the medium M by ejecting liquid onto the medium M transported by the glue belt 17. The liquid is, for example, the pre-treatment agent L1. The pre-treatment agent L1 is, for example, the dye preventing agent. In this case, the medium M is subjected to the dye preventing process by inkjet recording.

In step S12, the control unit 26 stores the dyeing liquid in the cleaning liquid storage unit. After the cleaning liquid is discharged from the cleaning liquid storage unit 32, the user operates the operation unit 45 to input color information of the dyeing liquid. The control unit 26 refers to the tone table data based on the color information received from the operation unit 45, and determines the ink supply amount to be supplied to the storage tank 34 from the plurality of dyeing liquid storage units 71 for each color. Then, the control unit 26 supplies the required ink supply amount of ink to the storage tank 34 by controlling the opening and closing of the open/close valve 75 for each color. Then, the dyeing liquid DL is stored in the storage tank 34 at a required proportion for the cleaning liquid storage unit 32. The control unit 26 rotates the cleaning brush 37 for a predetermined period of time required for toning to agitate the dyeing liquid DL having the plurality of colors supplied to the storage tank 34. As a result of this agitation, the dyeing liquid DL that has been toned to the specified color is stored in the storage tank 34.

In step S13, the control unit 26 performs dyeing on the medium M with the dyeing liquid DL. After the dyeing liquid DL has been stored, the user sandwiches, by the pair of transport rollers 52, 53 configuring the transport mechanism 51, the medium M drawn from a supply roll (not illustrated) set on the supply device disposed upstream in the transport direction Y. In addition, the user sets the portion hanging between the pair of transport rollers 52, 53 to a state of being immersed in the dyeing liquid DL. The user operates the operation unit 45 to initiate the driving of the dyeing unit 50. The control unit 26 drives the pair of transport rollers 52, 53 at a predetermined drive speed by driving the motor 30M, and continuously immerses the medium M in the dyeing liquid DL. As a result, the medium M is dyed to a predetermined color specified by the user.

Note that the process of step S11 may be a process in which the liquid ejecting unit 20 ejects the ink IL as an example of the liquid. In other words, the liquid ejecting unit 20 ejects the ink IL to perform printing on the medium M. In this case, the processing of steps S12 and S13 may be performed with the post-treatment agent L4 instead of the dyeing liquid. The post-treatment agent L4 may be, for example, the coating agent.

Next, the second printing method will be described. The control unit 26 performs processing of the second printing method illustrated in the flowchart in FIG. 23. The second printing method includes a printing method (FIGS. 12 to 14) in which the medium M is immersed in the dyeing liquid DL, and a printing method (FIGS. 18, 19) in which the medium M is immersed in the pre-treatment agent L3 (for example, the anti-bleeding agent).

In step S21, the control unit 26 stores the dyeing liquid in the cleaning liquid storage unit. Specifically, after the cleaning liquid CL is discharged from the cleaning liquid storage unit 32, the user operates the operation unit 45 to input color information of the dyeing liquid DL. The control unit 26 refers to the tone table data based on the color information received from the operation unit 45, and determines the ink supply amount to be supplied to the storage tank 34 from the plurality of dyeing liquid storage units 71 for each color. Then, the control unit 26 supplies the required ink supply amount of ink to the storage tank 34 by controlling the opening and closing of the open/close valve 75 for each color. Then, the dyeing liquid DL is stored in the storage tank 34 at a required proportion for the cleaning liquid storage unit 32. The control unit 26 rotates the cleaning brush 37 for a predetermined period of time required for toning to agitate the dyeing liquid DL having the plurality of colors supplied to the storage tank 34. As a result of this agitation, the dyeing liquid DL that has been toned to the specified color is stored in the storage tank 34.

In step S22, the control unit 26 performs dyeing on the medium with the dyeing liquid. After the dyeing liquid DL has been stored, the user sandwiches, by the pair of transport rollers 52, 53 configuring the transport mechanism 51, the medium M drawn from a supply roll (not illustrated) set on the supply device disposed upstream in the transport direction Y. In addition, the user sets the portion hanging between the pair of transport rollers 52, 53 to a state of being immersed in the dyeing liquid DL. The user operates the operation unit 45 to initiate the driving of the dyeing unit 50. The control unit 26 drives the pair of transport rollers 52, 53 at a predetermined drive speed by driving the motor 30M, and continuously immerses the medium M in the dyeing liquid DL. As a result, the medium M is dyed to a predetermined color specified by the user.

In step S23, the control unit 26 ejects the liquid from the liquid ejecting unit 20 onto the medium M. Specifically, the control unit 26 drives the motor (not illustrated) to drive the roller 16*a* to rotate and transport the medium M at a predetermined transport speed by the glue belt 17. The liquid ejecting unit 20 performs processing on the medium M by ejecting liquid onto the medium M transported by the glue belt 17. The liquid ejecting unit 20 ejects the post treatment agent L2 onto the medium M as an example of the liquid. Note that, in steps S21 and S22, the dyeing liquid may be replaced to the anti-bleeding agent as an example of the pre-treatment agent L3. In this case, in step S23, the liquid ejecting unit 20 may eject the ink IL.

According to the printing apparatus 11 of the present exemplary embodiment, the dyeing of the medium M immersed in the dyeing liquid DL and the ejecting of the liquid by the liquid ejecting unit 20 are used in combination, whereby banding that can be generated when printing a background image, etc. by the inkjet type liquid ejecting unit 20 can be suppressed.

According to the first exemplary embodiment, the following effects can be obtained.

(1-1) The printing apparatus 11 includes the glue belt 17 as an example of the transport belt including the support unit 17*a* configured to support the medium M, the transport belt being configured to transport the medium M by moving the support unit 17*a*, the liquid ejecting unit 20 configured to eject liquid onto the medium M supported by the support unit 17*a*, and the dyeing unit 50 configured to perform dyeing by immersing the medium M in the dyeing liquid DL. Printing is performed on the medium M by combining dyeing by the dyeing unit 50 and ejecting by the liquid ejecting unit 20. According to this configuration, banding does not occur in the portion where the medium M is dyed (for example, background, etc.). Thus, high quality printing with suppressed banding can be performed.

(1-2) The liquid ejecting unit 20 is capable of ejecting at least one of a dye extracting agent for extracting the color of the medium M or a dye preventing agent for preventing coloring due to dyeing. According to this configuration, the dye extracting agent or the dye preventing agent can be ejected from the liquid ejecting unit 20, whereby a fine image or gradation can be generated with respect to the medium M.

(1-3) The printing apparatus 11 includes the cleaning brush 37 as an example of the cleaning unit that performs the cleaning operation on the glue belt 17 using the cleaning liquid CL, and the cleaning liquid storage unit 32 that stores the cleaning liquid CL. When dyeing is performed by the dyeing unit 50, the dyeing liquid DL is stored in the cleaning liquid storage unit 32. According to this configuration, when printing is normally performed by the liquid ejecting unit 20, cleaning of the glue belt 17 is performed using the cleaning liquid CL stored in the cleaning liquid storage unit 32 while printing is performed. When the dyeing unit 50 performs dyeing, the cleaning liquid CL is extracted from the cleaning liquid storage unit 32, and the dyeing liquid DL is stored instead. This eliminates the need to provide a storage unit for dyeing to store the dyeing liquid DL.

(1-4) The printing apparatus 11 includes the liquid storage unit 40 (ink storage unit 40A) capable of supplying liquid to the liquid ejecting unit 20. The liquid stored in the liquid storage unit 40 is at least used as part of the dyeing liquid DL. According to this configuration, liquid (ink) obtained from the liquid storage unit 40 is used as part of the dyeing liquid DL. As a result, printing can be performed without newly preparing the dyeing liquid DL. In addition, even when the dyeing liquid DL is insufficient during printing, the need for new preparation is omitted.

(1-5) The liquid storage unit 40 stores liquids having a plurality of colors. The liquids having a plurality of colors are combined and used as at least part of the dyeing liquid DL. According to this configuration, by combining the ink having the plurality of colors stored in the liquid storage unit 40, the dyeing liquid DL having a specific color can be generated.

(1-6) The liquid discharged by the liquid ejecting unit 20 as maintenance operation is at least used as part of the dyeing liquid DL. According to this configuration, the liquid discharged in the maintenance operation that has been discarded in the recent configuration is used as the dyeing liquid DL, whereby the environmental load can be reduced.

(1-7) The printing system 10 includes the printing apparatus 11, and the drying mechanism 100 that dries both the medium M printed by the liquid ejecting unit 20 and the medium M dyed by the dyeing unit 50. According to this configuration, drying after ejecting in the liquid ejecting unit 20 and drying after dyeing in the dyeing unit 50 can be performed by one mechanism, so drying can be performed without increasing the size of the device.

(1-8) The printing apparatus 11 includes the cleaning brush 37 that performs the cleaning operation on the glue belt 17 using the cleaning liquid CL, and the cleaning liquid storage unit 32 that stores the cleaning liquid CL. In the case where the ink is ejected from the liquid ejecting unit 20, the pre-treatment agent is stored in the cleaning liquid storage unit 32 prior to this ejecting. The pre-treatment is performed by immersing the medium M in the pre-treatment agent stored in the cleaning liquid storage unit 32. According to this configuration, by storing the pre-treatment agent in the cleaning liquid storage unit 32, a location for newly storing the pre-treatment agent is not provided, whereby the device can be made smaller.

(1-9) In the printing system 10 including the printing apparatus 11, the cleaning liquid storage unit 32 is capable of storing the cleaning liquid CL or the dyeing liquid DL, and the system includes the holding tank coupled to the cleaning liquid storage unit 32 and capable of holding the cleaning liquid CL or the dyeing liquid DL stored in the cleaning liquid storage unit 32. According to this configuration, the holding tank is provided that temporarily holds the liquid stored in the cleaning liquid storage unit 32, whereby the liquid stored prior to replacing the liquid is not wasted.

(1-10) The printing system 10 including the printing apparatus 11 includes the cleaning brush 37 that performs the cleaning operation on the glue belt 17 using the cleaning liquid CL, and the cleaning liquid storage unit 32 that stores the cleaning liquid CL. When printing is performed by ejecting ink from the liquid ejecting unit 20, the pre-treatment agent is stored in the cleaning liquid storage unit 32, and the pre-treatment is performed by immersing the medium M in the pre-treatment agent stored in the cleaning liquid storage unit 32. According to this configuration, by placing the pre-treatment agent in the cleaning liquid storage unit 32, a location at which the pre-treatment agent is newly stored is not provided, whereby the printing system can be made smaller.

(1-11) The cleaning liquid storage unit 32 is capable of storing the cleaning liquid CL or the pre-treatment agent, and the printing system 10 includes the printing apparatus 11, the holding tank 55 coupled to the cleaning liquid storage unit 32 and capable of holding the cleaning liquid CL discharged from the cleaning liquid storage unit 32, and the third holding tank 57 capable of holding the pre-treatment agent L1 discharged from the cleaning liquid storage unit 32.

According to this configuration, the cleaning liquid CL or the pre-treatment agent L1 stored in the cleaning liquid storage unit 32 can be temporarily held in the holding tank 55, 57, whereby the previously stored liquid is not wasted when replacing the liquid.

(1-12) The printing apparatus 11 includes the glue belt 17 including the support unit 17*a* configured to support the medium M, the glue belt 17 being configured to transport the medium M by moving the support unit 17*a*, the liquid ejecting unit 20 configured to eject liquid onto the medium M supported by the support 17*a*, the cleaning brush 37 configured to perform cleaning operation on the glue belt 17 using the cleaning liquid CL, het cleaning liquid storage unit 32 configured to store the cleaning liquid CL, and the dyeing unit 50 configured to perform dyeing by immersing the medium M in the dyeing liquid DL. The printing method for the printing apparatus 11 includes the following steps. In other words, the printing method for the printing apparatus 11 includes the steps of ejecting the liquid from the liquid ejecting unit 20, storing the dyeing liquid DL in the cleaning liquid storage unit 32, and dyeing the medium M with the dyeing liquid DL. Note that each of the steps of the printing method is performed in no particular order. According to this method, dyeing and other printing can be performed by one printing apparatus 11, whereby banding does not occur in the portion where the medium M is dyed (for example, background, etc.). Thus, high quality printing with suppressed banding can be performed. In addition, dyeing and other printing can be performed by one printing apparatus 11, whereby printing can be performed in a space-saving manner.

Second Exemplary Embodiment

Next, a second exemplary embodiment will be described below with reference to the accompanying drawings. The configuration of the dyeing unit is different from that of the first exemplary embodiment. In other words, in the first exemplary embodiment, the medium M is immersed in the dyeing liquid DL stored in the storage tank 34 of the cleaning unit 30 to perform dyeing on the medium M, however, the printing apparatus 11 according to the second exemplary embodiment includes a dropping unit 90 as an example of the dyeing unit configured to perform dyeing on the medium M by dropping the dyeing liquid DL onto the medium M supported by the support unit 17*a*. Note that the configuration is the same as that of the first exemplary embodiment except that the configuration of the dyed unit is different, so that in particular, only the configuration different from the first embodiment will be described.

Configuration of Printing System

Figure 24:
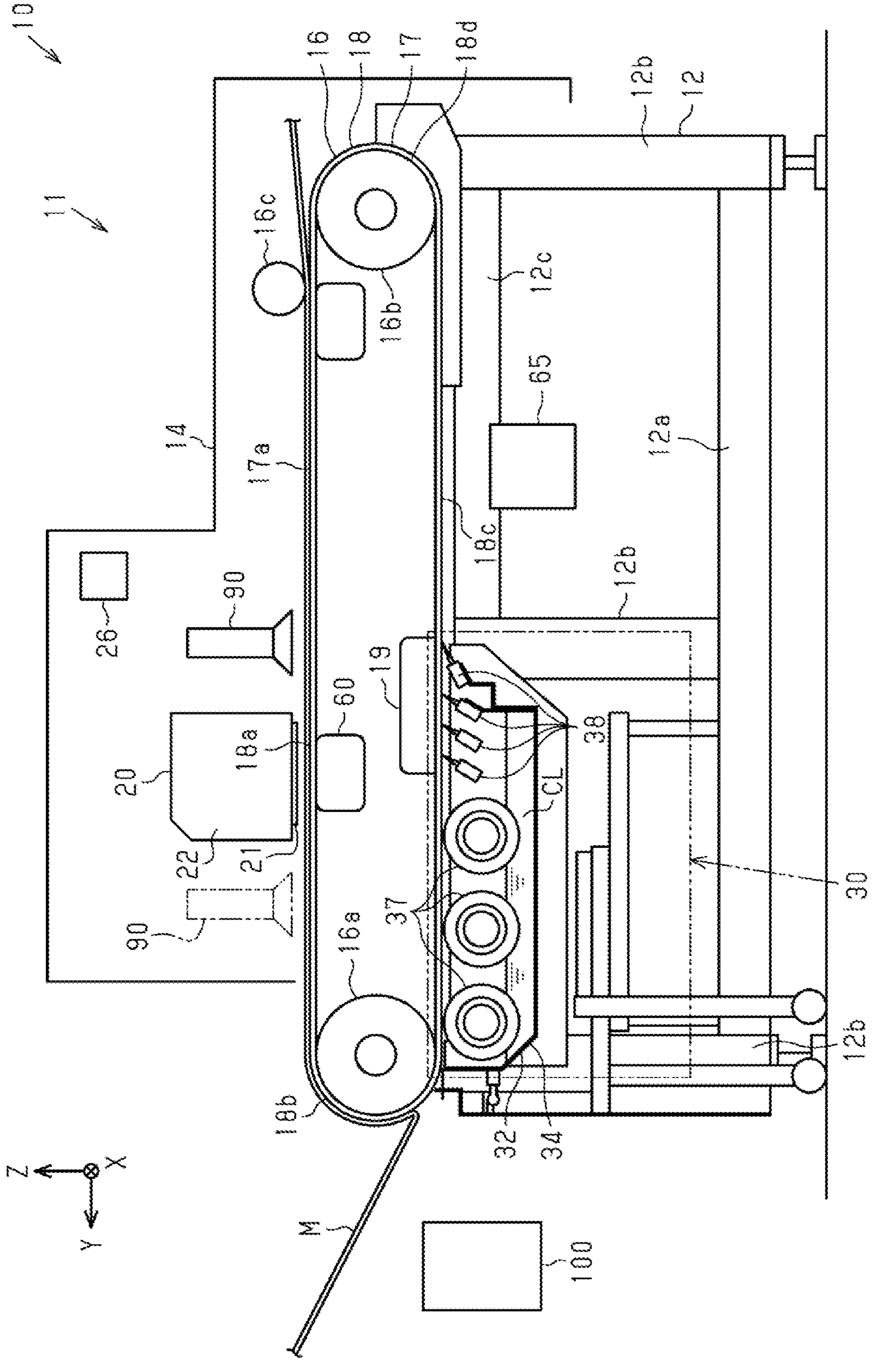
FIG. 24 is a side cross-sectional view illustrating an internal structure of a printing system according to a second exemplary embodiment.

As shown in FIG. 24, as in the first exemplary embodiment, the printing system 10 includes the printing apparatus 11 and the drying mechanism 100 in the present exemplary embodiment as well. The printing apparatus 11 includes the glue belt 17, which is an example of the transport belt that supports and transports the medium M as the support unit 17*a*, the liquid ejecting unit 20 configured to perform printing operation by ejecting liquid onto a medium M supported by the glue belt 17, and the dropping unit 90 as an example of the dyeing unit for dyeing the medium M by dropping the dyeing liquid DL. The printing apparatus 11 performs printing on the medium M by combining the dyeing by the dropping unit 90 and the ejecting at the liquid ejecting unit 20. The dropping here means that an ink droplet having a diameter larger than that of the ink droplet ejected by the liquid ejecting unit 20 is ejected toward the medium. The drying mechanism 100 dries both the medium M printed by the liquid ejecting unit 20 and the medium M dyed by the dropping unit 90.

As illustrated in FIG. 24, the dropping unit 90 is disposed at a position on the upstream or a position on the downstream of the liquid ejecting unit 20 in the transport direction Y. In an example illustrated in FIG. 24, the dropping unit 90 is disposed at a position upstream of the liquid ejecting unit 20 in the transport direction Y. The attachment position of the dropping unit 90 can be switched between a position on the upstream and a position on the downstream in the transport direction Y with respect to the liquid ejecting unit 20.

In a case where dyeing by the dropping unit 90 needs to be performed prior to ejecting by the liquid ejecting unit 20, the user causes the dropping unit 90 disposed at a position upstream of the liquid ejecting unit 20. On the other hand, in a case where dyeing by the dropping unit 90 needs to be performed after ejecting by the liquid ejecting unit 20, the dropping unit 90 is disposed at a position downstream of the liquid ejecting unit 20 in the transport direction Y. Note that the dropping unit 90 may be provided at both a position on the upstream and a position on the downstream in the transport direction Y with respect to the liquid ejecting unit 20.

Figure 25:
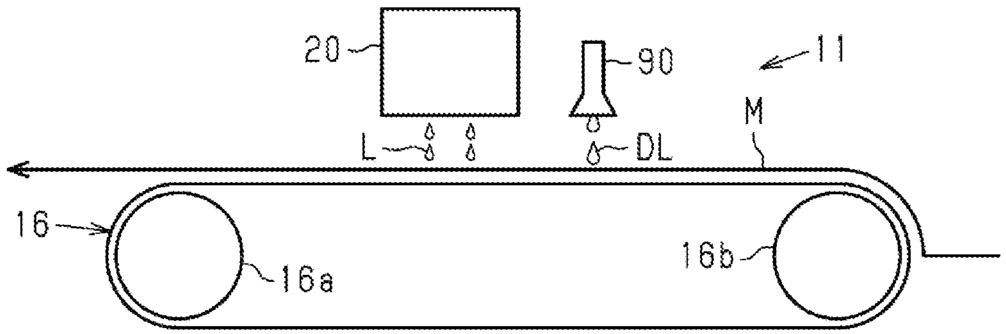
FIG. 25 is a schematic side cross-sectional view illustrating the printing apparatus including the liquid ejecting unit and a dropping unit.

As illustrated in FIG. 25, the liquid ejecting unit 20 is capable of ejecting the liquid L supplied from the liquid storage unit 40 (see FIGS. 1 and 27) onto the medium M. For example, the liquid ejecting unit 20 is capable of ejecting ink, which is an example of the liquid L supplied from the ink storage unit 40A, onto the medium M. Furthermore, the liquid ejecting unit 20 is capable of ejecting at least one of a dye extracting agent for extracting the color of the medium M or a dye preventing agent for preventing coloring due to dyeing.

The dropping unit 90 is capable of dropping the dyeing liquid DL onto the medium M. The dropping unit 90 performs dyeing on the medium M by dropping the dyeing liquid DL onto the medium M. The dropping unit 90 can perform dyeing in accordance with the printing data, and the dyeing liquid DL can perform dropping in accordance with the location at which the liquid is ejected by the liquid ejecting unit 20. Specifically, the control unit 26 (see FIG. 24) performs ejecting control of the liquid ejecting unit 20 and dropping control of the dropping unit 90 based on the printing data. As illustrated in FIG. 25, dyeing by the dropping unit 90 dropping the dyeing liquid DL onto the medium M transported by the glue belt 17, and ejecting the liquid L by the liquid ejecting unit 20 may be performed by different positions in the transport direction Y. In addition, when drying of the medium M is necessary between the step of dyeing by dropping the dyeing liquid DL with the dropping unit 90 and the step of ejecting the liquid L by the liquid ejecting unit 20, the medium M may be transported individually for each step. Further, the dropping unit 90 can drop liquid such as a pre-treatment agent or a post-treatment agent.

Configuration of Dropping Unit

Figure 26:
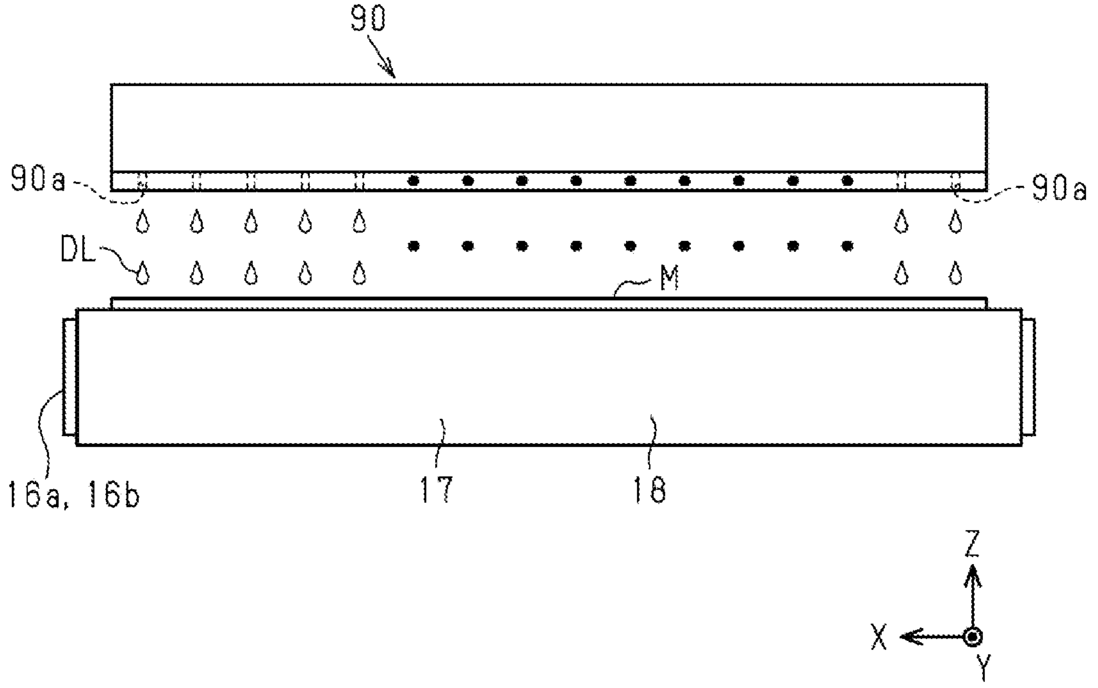
FIG. 26 is a schematic front view illustrating the printing apparatus including the dropping unit.

As illustrated in FIG. 26, the dropping unit 90 includes a nozzle 90*a* to drop the dyeing liquid DL, wherein a plurality of the nozzles 90*a* are disposed side by side in the width direction of the medium M. The dropping unit 90 has the plurality of nozzles 90*a* in the width direction X so as to be able to dye the entire width of the medium M having the maximum assumed width. The plurality of nozzles 90*a* are provided at regular intervals in the width direction X at the dropping unit 90. The width of the dropping unit 90 need not be the same as the maximum assumed width of the medium, but may be shorter than the maximum assumed width of the medium M. The interval between a pair of nozzles 90*a* located at both ends in the width direction X among the plurality of nozzles 90*a* may be shorter than the width of the medium M having the maximum assumed width. The nozzles 90*a* at both ends are set to positions where the side ends of the medium M can be dyed even when the position of the medium M in the width direction X is shifted within an acceptable range. Since the dyeing liquid DL dropped from the nozzle 90*a* spreads out penetrating the fibers of the medium M after landing, the nozzles 90*a* at both ends may be located at positions such that the dropped dyeing liquid DL can spread to the side ends of the medium M in the width direction X.

The dropping unit 90 may include a solenoid valve (not illustrated) common to all of the nozzles 90*a*, may include a valve for each group of the nozzles 90*a*, or may further include a valve corresponding to each nozzle 90*a*. The control unit 26 adjusts the amount of liquid dropped from the nozzle 90*a* by controlling the opening and closing of the valve of the dropping unit 90 and the opening degree at the time of opening the valve. Further, in a case of a configuration including a plurality of valves, the control unit 26 selects the valve to be opened and the opening degree of the opened valve, so that the amount of liquid dropped from the nozzle 90*a* may be adjusted for each nozzle group or for each individual nozzle 90*a*.

In the present exemplary embodiment, the dropping unit 90 is an example of the dyeing unit, and the medium M is dyed with the dyeing liquid DL dropped from the dropping unit 90. The configuration of the dyeing liquid supply unit 70 that supplies the dyeing liquid DL to the dropping unit 90 is basically the same as the first exemplary embodiment.

Figure 27:
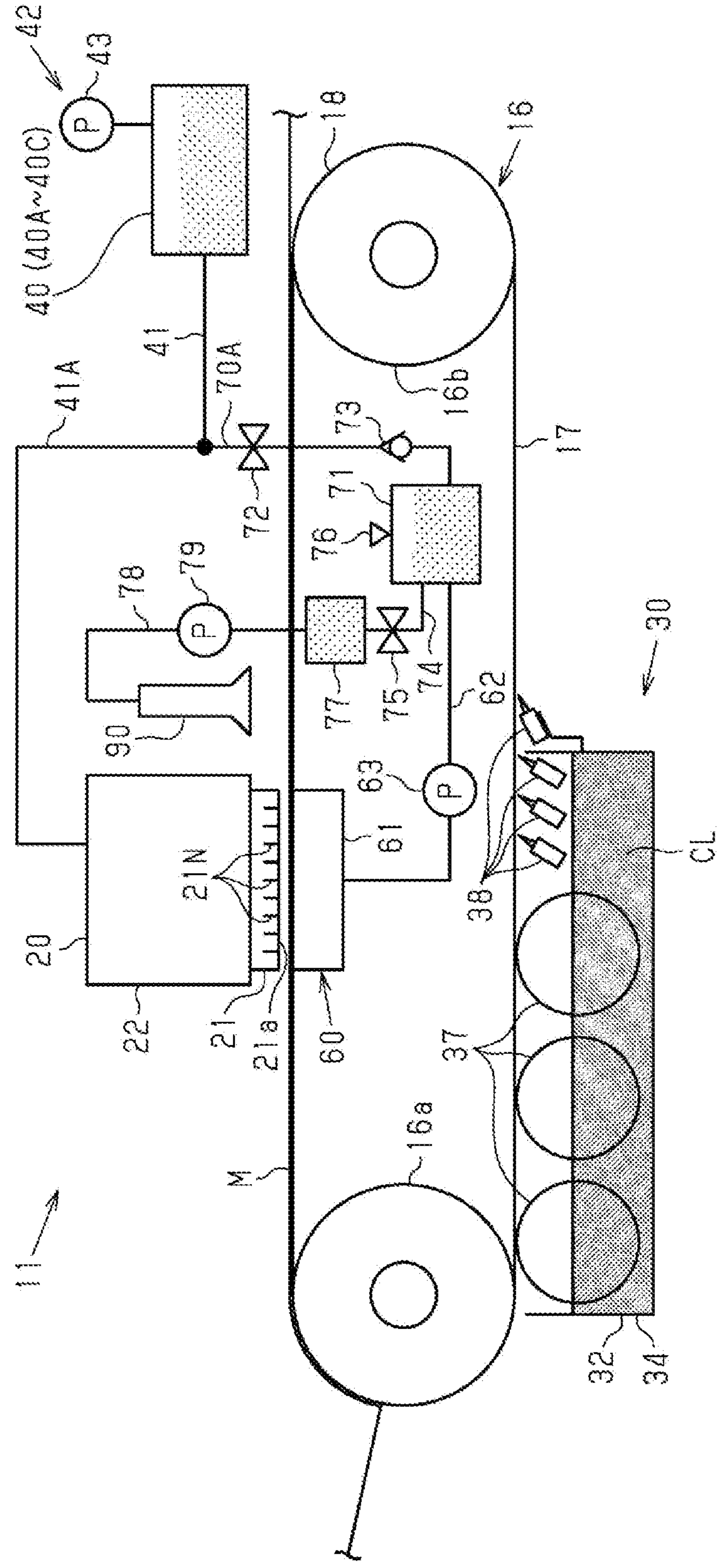
FIG. 27 is a circuit diagram illustrating a liquid ejecting unit and a liquid supply system of the dyeing unit in the printing apparatus.

As illustrated in FIG. 27, the printing apparatus 11 includes the dyeing liquid supply unit 70 that supplies the dyeing liquid DL used by the dropping unit 90. The printing apparatus 11 includes the dyeing liquid storage unit 71 in which the dyeing liquid is temporarily stored before being supplied to the storage tank 34. In the dyeing liquid supply unit 70, the maintenance unit 60 performs the maintenance operation to collect for each color the waste liquid (ink) that is liquid ejected or discharged from the nozzle 21N of the liquid ejecting head 21 and received by the cap 61, and stores the collected ink for each color as dyeing liquid in the dyeing liquid storage unit 71 for each color. The liquid discharged by the liquid ejecting unit 20 as maintenance operation is at least used as part of the dyeing liquid DL.

The liquids having a plurality of colors are combined and used as at least part of the dyeing liquid. The plurality of (N) dyeing liquid storage units 71, which are the same number as the number of colors, is coupled to the storage tank 34 through a plurality of (N) pipe paths 74. An open/close valve 75 capable of individually opening and closing the pipe path 74 is provided in the middle of the plurality of (N) pipe paths 74. The dyeing liquid stored for each color in the dyeing liquid storage unit 71 is supplied to the storage tank 34 by opening the open/close valve 75. When the dyeing liquid DL having the plurality of colors is supplied to the storage tank 34, the dyeing liquid DL having the plurality of colors is toned in the storage tank 34. Note that the dyeing liquid DL that has been toned in the toning storage unit may be supplied to the storage tank 34 by providing the toning storage unit for storing the dyeing liquid DL having at least part of the selected colors of the dyeing liquid DL having the plurality of colors stored in the plurality of dyeing liquid storage units 71, and performing the toning.

The printing apparatus 11 includes the liquid storage unit 40 capable of supplying liquid to the liquid ejecting unit 20. The liquid stored in the liquid storage unit 40 is at least used as part of the dyeing liquid. The liquid storage unit 40 stores liquids having a plurality of colors. In other words, the liquid storage unit 40 includes the plurality of ink storage units 40A (see FIG. 1) that store the ink having a plurality of colors respectively. The supply flow path 41 extending from the liquid storage unit 40 branches on the route, and the branched dyeing liquid supply flow path 70A is coupled to the dyeing liquid storage unit 71. The dyeing liquid prior to being supplied to the storage tank 34 is stored in the dyeing liquid storage unit 71.

The waste liquid feed flow path 62 extending from the maintenance unit 60 merges with the dyeing liquid supply flow path 70A. The ink received as waste liquid by the cap 61 of the maintenance unit 60 is supplied to the dyeing liquid storage unit 71 through the waste liquid feed flow path 62 and the dyeing liquid supply flow path 70A.

The liquid discharged by the liquid ejecting unit 20 as maintenance operation is at least used as part of the dyeing liquid. When the dyeing liquid of the dyeing liquid storage unit 71 is insufficient, the liquid from the liquid storage unit 40 may be replenished as dyeing liquid. Between the liquid storage unit 40 and the dyeing liquid storage unit 71, an open/close valve 72 and a check valve 73 are provided in the middle of the dyeing liquid supply flow path 70A branched from the supply flow path 41. The check valve 73 permits liquid flow from the liquid storage unit 40 to the dyeing liquid storage unit 71 and prevents liquid flow to the opposite orientation thereof.

The dyeing liquid supply unit 70 includes a liquid volume sensor 76 that detects the liquid volume of the dyeing liquid stored in the dyeing liquid storage unit 71. The liquid volume sensor 76 detects the insufficiency of the dyeing liquid. The open/close valve 72 is opened when the liquid volume detected by the liquid volume sensor 76 is less than the predetermined lower limit value of the liquid volume, and is closed when the predetermined liquid volume upper limit value is reached. Thus, the required amount of the dyeing liquid is stored in the dyeing liquid storage unit 71. Note that the printing apparatus 11 may include a dyeing liquid supply source dedicated to the dyeing liquid (a dyeing liquid supply tank), in addition to the liquid storage unit for storing the liquid to be supplied to the liquid ejecting unit 20. Furthermore, a configuration may be adopted wherein when the liquid volume of the dyeing liquid storage unit 71 is insufficient, the dyeing liquid may be supplied from the dyeing liquid supply source rather than from the liquid storage unit 40.

The dropping unit 90, which is an example of the dyeing unit of the present exemplary embodiment, is located above and facing the support unit 17*a*, and is located above the dyeing liquid storage unit 71. Therefore, the dyeing liquid DL is supplied from the dyeing liquid storage unit 71 to the dropping unit 90 by a pump 79 against gravity. The dyeing liquid storage unit 71 and the storage tank 34 are coupled through the dyeing liquid supply flow path. The toning storage unit 77 and the dropping unit 90 are coupled through the supply flow path 78. The pump 79 is provided in the middle of the supply flow path 78. The dyeing liquid DL is supplied from the toning storage unit 77 to the dropping unit 90 by driving the pump 79.

As illustrated in FIG. 27, the printing apparatus 11 includes the pressurizing mechanism 42 having the pressurizing pump 43, similar to the first exemplary embodiment.

The liquid storage unit 40 is pressurized by the pressurizing mechanism 42 to supply the liquid to the liquid ejecting unit 20.

The printing apparatus 11 includes the liquid storage unit 40 illustrated in FIG. 1 capable of supplying liquid to the liquid ejecting unit 20. The printing apparatus 11 includes the ink storage unit 40A illustrated in FIG. 1 capable of supplying ink as an example of liquid to the liquid ejecting unit 20. The printing apparatus 11 uses ink stored in the ink storage unit 40A as at least part of the dyeing liquid. In the present exemplary embodiment, as in the first exemplary embodiment, the liquid (waste liquid) discharged from the liquid ejecting unit 20 in the maintenance operation is at least used as part of the dyeing liquid DL. In a case where the dyeing liquid DL is insufficient when the liquid discharged in the maintenance operation is used as the dyeing liquid, the ink is replenished as at least part of the dyeing liquid DL from the ink storage unit 40A.

Next, action of the printing apparatus 11 will be described.

The printing system 10 and the printing apparatus 11 according to the present exemplary embodiment can perform printing (digital printing) on the medium M by the inkjet type liquid ejecting unit 20 and dyeing by the dyeing unit 50.

The printing apparatus 11 can perform a plurality of types (four types in the present example) of printing on the medium M.

(1) printing is performed with a dye extracting step of ejecting the dye extracting agent as the post-treatment agent L2;

(2) printing is performed with a dye preventing step of ejecting the dye preventing agent as the pre-treatment agent L1;

(3) printing is performed with a pre-treatment step of immersing the material in an anti-bleeding agent as the pre-treatment agent L3; and (4) printing is performed with a post-treatment step of immersing the material in a coating agent as the post-treatment agent L4.

Note that printing can also be performed by combining the aforementioned (1) or (2) and the aforementioned (3) or (4).

The printing methods of (1) to (4) described above will be described in order below.

Printing with Dye Extracting Step

First, a printing process with the dye extraction will be described with reference to FIGS. 28 to 30. Note that in FIGS. 28 to 37, in the following drawing, the cleaning liquid storage unit 32 that cleans the glue belt 17 is omitted when the liquid ejecting unit 20 performs printing.

Figure 28:
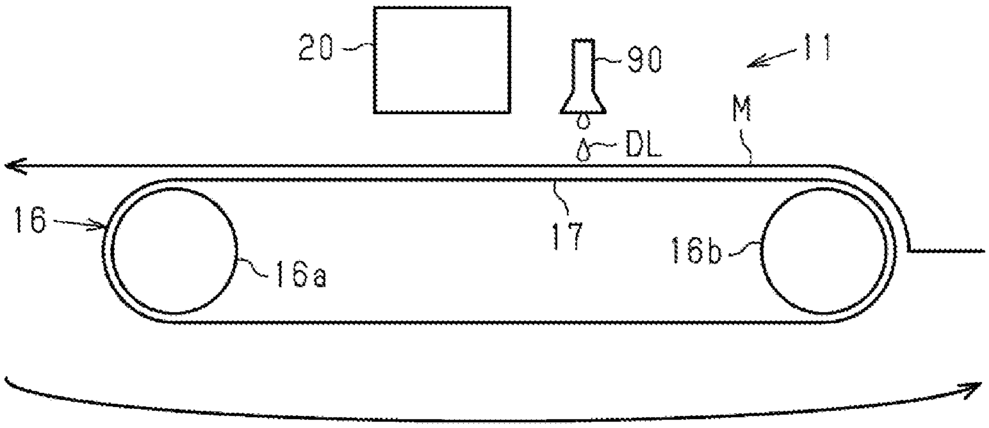
FIG. 28 is a schematic side cross-sectional view illustrating the printing apparatus in a step of dyeing a medium prior to dye extraction.

As illustrated in FIG. 28, first, the medium M is dyed by dropping the dyeing liquid DL from the dropping unit 90 onto the medium M transported by the glue belt 17. At this time, the user inputs color information to be dyed by the operation of the operation unit 45. The control unit 26 refers to the tone table data based on the color information input from the operation unit 45, and determines the dyeing liquid for the required color and the mixing ratio thereof. The control unit 26 opens the open/close valve 75 corresponding to the required color among the plurality of open/close valves 75 (FIG. 27), and supplies the amount of dyeing liquid corresponding to the required mixing ratio from the corresponding dyeing liquid storage unit 71 to the toning storage unit 77. The toning storage unit 77 is coupled to the plurality of dyeing liquid storage units 71 through the plurality of pipe paths 74. The plurality of open/close valves 75 are provided in the middle of the plurality of pipe paths 74. One or more open/close valves 75 selected in accordance with the color information among the plurality of open/close valves 75 are opened. The dyeing liquid DL is toned by the toning storage unit 77, where the dyeing liquid DL has a color corresponding to the color information input by the user in the operation unit 45, When the toning is performed, the dyeing liquid DL in the toning storage unit 77 is agitated by an agitator (not illustrated). As a result, the dyeing liquid DL in the toning storage unit 77 is toned to a uniform color. After this toning has ended, the user sets the medium M drawn from a supply roll (not illustrated) disposed upstream in the transport direction Y to the glue belt 17.

Thereafter, as illustrated in FIG. 28, the medium M is transported by driving the glue belt 17. The dropping unit 90 drops the dyeing liquid DL, which is toned to a predetermined color specified by the user, to the medium M. In other words, the medium M is dyed by the dyeing liquid DL dropped from the dropping unit 90. For example, banding tends to occur when printing is performed with digital printing by inkjet recording. On the other hand, since the dyeing is performed by analog printing, the banding does not occur. The dyed medium M is dried by the drying mechanism 100 (see FIG. 24). The medium M dyed in this manner is wound in a roll form by the winding device (not illustrated). The rolled roll after dyeing is then set as a supply roll.

Figure 29:
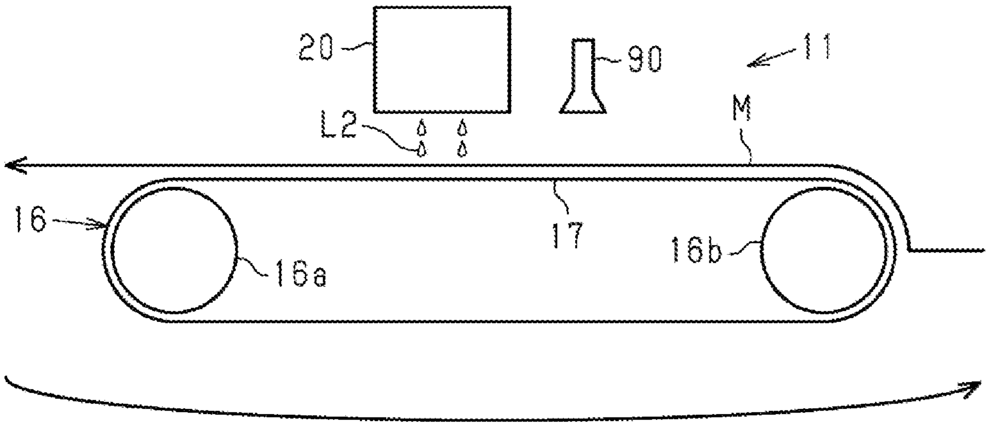
FIG. 29 is a schematic side cross-sectional view illustrating the printing apparatus in a dye extracting process.

As illustrated in FIG. 29, the medium M is transported by the glue belt 17. The liquid ejecting unit 20 ejects the dye extracting agent as the post-treatment agent L2 with respect to the medium M. This ejecting of the post-treatment agent L2 is performed by the digital printing. The dyeing is removed from the portion where the dye extracting agent lands. As a result, for example, delicate lines and patterns in the medium M after dyeing are extracted. Further, the user sets the roll after dye extraction as a supply roll.

Figure 30:
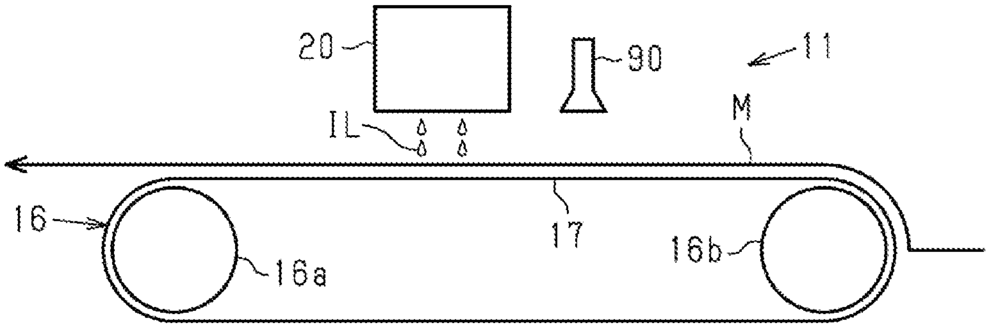
FIG. 30 is a schematic side cross-sectional view illustrating the printing apparatus in a step of printing after the dye extraction.

As illustrated in FIG. 30, the medium M is transported by the glue belt 17. The liquid ejecting unit 20 ejects ink IL to the medium M. The ink IL is printed on the extracted portion of the medium M. As a result, a color is applied to, for example, a pattern in a extracted portion. In other words, a color pattern is printed onto the medium M. Since the background portion of this printed matter is dyed, streaks due to banding are suppressed.

Printing with Dye Preventing Step

Next, a printing process with the dye prevention will be described with reference to FIGS. 31 to 33.

Figure 31:
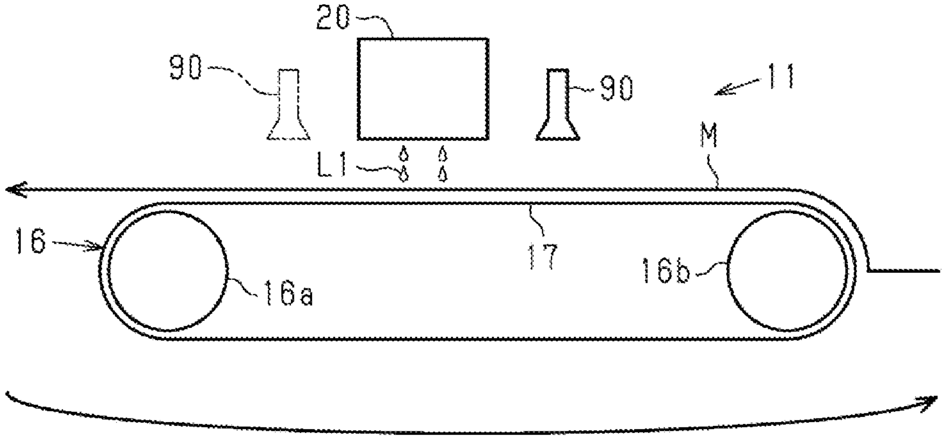
FIG. 31 is a schematic side cross-sectional view illustrating the printing apparatus in a step of printing a dye preventing agent.

As illustrated in FIG. 31, first, the medium M is transported by the glue belt 17. The liquid ejecting unit 20 ejects the pre-treatment agent L1 onto the medium M. The pre-treatment agent L1 is, for example, a dye preventing agent. The dye preventing agent is ejected in advance into a portion of the medium M that is not desired to be dyed. For example, a pattern, etc. is applied to the medium M by the dye preventing agent. The medium M that has undergone the dye prevention is dried by the drying mechanism 100 (see FIG. 24). Thus, the medium M that has undergone the dye prevention is wound in a roll form by the winding device (not illustrated). Next, the roll wound after the dye prevention is set as a supply roll.

Figure 32:
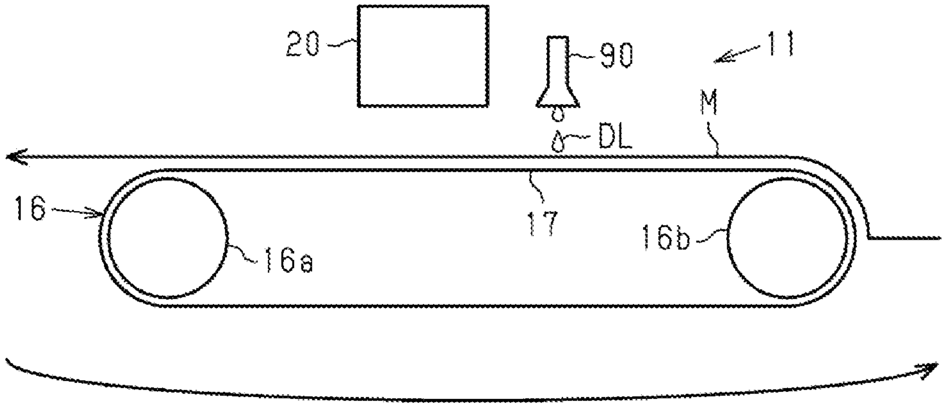
FIG. 32 is a schematic side cross-sectional view illustrating the printing apparatus in a step of dyeing a medium after an dye preventing process.

Next, as illustrated in FIG. 32, the, medium M is transported by driving the glue belt 17. The dropping unit 90 drops the dyeing liquid DL, which is toned to a predetermined color specified by the user, to the medium M. In other words, the medium M is dyed by the dyeing liquid DL dropped from the dropping unit 90. For example, banding tends to occur when printing is performed with digital printing by inkjet recording. On the other hand, since the dyeing is performed by analog printing, the banding does not occur. The dyed medium M is dried by the drying mechanism 100 (see FIG. 24). The medium M dyed in this manner is wound in a roll form by the winding device (not illustrated). The rolled roll after dyeing is then set as a supply roll. Note that when sufficient drying of the pre-treatment agent L1, such as a dye preventing agent, is available or sufficient drying of the pre-treatment agent L1 is not necessary, this dyeing may be performed together with the dye prevention. In other words, as illustrated by the two-dot chain line in FIG. 31, the dropping unit 90 may be disposed downstream in the transport direction Y (left side in FIG. 31) with respect to the liquid ejecting unit 20, and the ejecting of the pre-treatment agent L1 and dropping of the dyeing liquid DL may be performed on the medium M in the same transport process.

Figure 33:
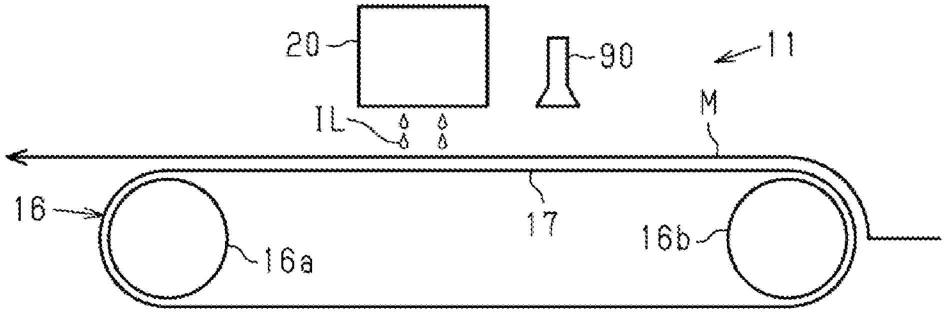
FIG. 33 is a schematic side cross-sectional view illustrating the printing apparatus in a step of printing after the dye prevention.

As illustrated in FIG. 33, the medium M after dyeing is transported by the glue belt 17. The liquid ejecting unit 20 ejects the ink IL onto the medium M. The ink IL is ejected into the portion that is not dyed by the dye preventing agent, for example, a color pattern is printed. The medium M at which the pattern, etc. is printed by digital printing is dried by the drying mechanism 100 (see FIG. 24), and then wound into a roll form by the winding device (not illustrated).

Printing with Pre-Treatment Step

Next, a printing process with the post-treatment will be described with reference to FIGS. 34 and 35.

Figure 34:
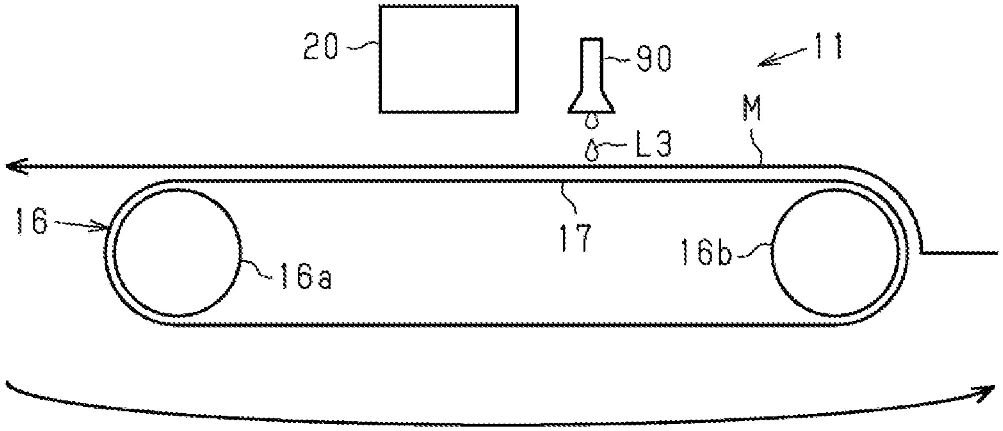
FIG. 34 is a schematic side cross-sectional view illustrating the printing apparatus in a step of performing pre-treatment.

First, as illustrated in FIG. 34, the medium M is transported by the glue belt 17. When printing is performed by ejecting the ink IL by the liquid ejecting unit 20, the dropping unit 90 drops the pre-treatment agent L3 made of, for example, an anti-bleeding agent prior to the printing to perform pre-treatment (anti-bleeding treatment) on the medium M. A roll wound while drying the pre-treatment agent L3 is set on the supply side.

Figure 35:
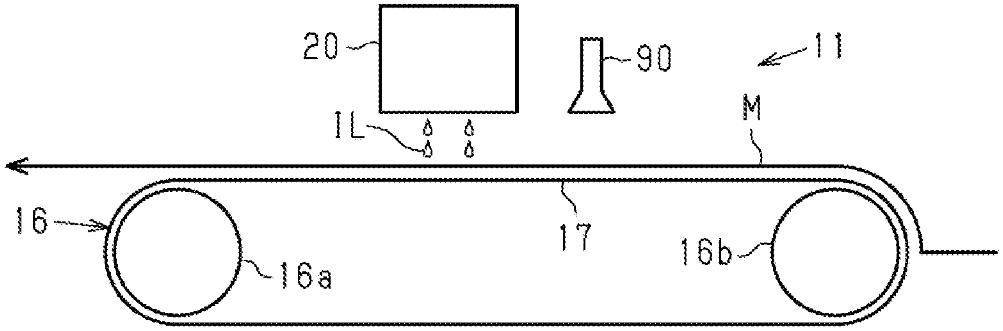
FIG. 35 is a schematic side cross-sectional view illustrating the printing apparatus in a step of printing on a medium after pre-treatment.

Next, as illustrated in FIG. 35, the medium M that has been subjected to the anti-bleeding treatment is transported by the glue belt 17. The liquid ejecting unit 20 ejects the ink IL onto the medium M, which has been subjected to the anti-bleeding treatment. The ink IL is printed onto the medium M without bleeding. After printing, the medium M is dried by the drying mechanism 100 (see FIG. 24), and then wound into a roll form by the winding device (not illustrated).

Printing with Post-Treatment Step

Figure 36:
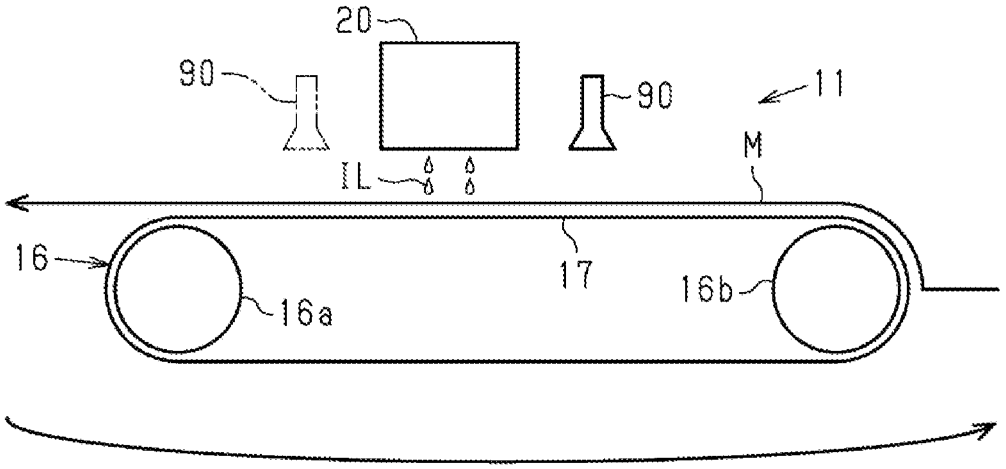
FIG. 36 is a schematic side cross-sectional view illustrating the printing apparatus in a step of printing on a medium before post-processing.

Next, a printing process with the post-treatment will be described with reference to FIGS. 36 and 37.

In a case where printing is performed by ejecting the ink IL from the liquid ejecting unit 20, the dropping unit 90 ejects the post-treatment agent L4 onto the medium M after printing to perform post treatment. First, as illustrated in FIG. 36, the medium M is transported by the glue belt 17. The printing is performed by the liquid ejecting unit 20 ejecting the ink IL onto the medium M. A roll wound while drying the ink IL is set on the supply side.

Figure 37:
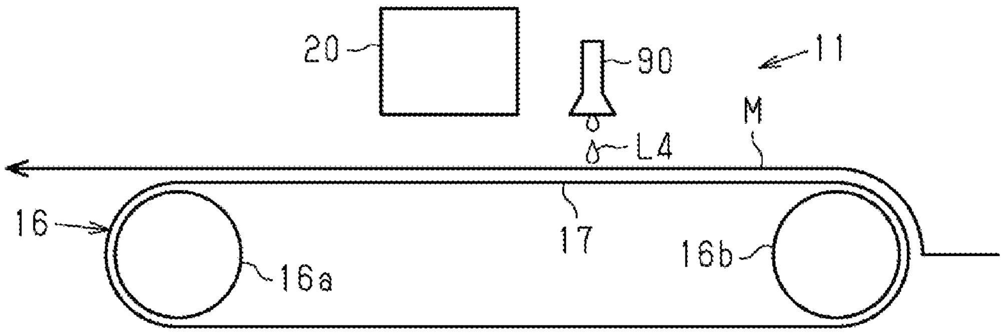
FIG. 37 is a schematic side cross-sectional view illustrating the printing apparatus in a step of performing post-processing after printing.

Next, as illustrated in FIG. 37, the medium M is transported by the glue belt 17. The dropping unit 90 drops the post-treatment agent L4 onto the medium M. The post-treatment agent L4 is, for example, a coating agent. The printing surface of the medium M is covered with the coating agent. The medium M is wound in a roll form while the post-treatment agent L4 is dried. In the medium M at which the coating agent is dried, the ink layer is protected by the coating layer. Therefore, even when the medium M is subjected to an external force such as friction, etc., the ink layer will not easily peel off.

In addition, when the liquid ejecting unit 20 ejects the liquid and then the dropping unit 90 drops the dyeing liquid to perform dyeing on the medium M, printing is performed by the first printing method illustrated in FIG. 22. In addition, when the liquid ejecting unit 20 ejects liquid after the dropping unit 90 drops the dyeing liquid to perform dyeing on the medium M, printing is performed by the second printing method illustrated in FIG. 23.

According to the second exemplary embodiment, the following effects can be obtained.

(2-1) The printing apparatus 11 includes the glue belt 17 including the support unit 17*a* configured to support the medium M, the glue belt 17 being configured to transport the medium M by moving the support unit 17*a*, the liquid ejecting unit 20 configured to eject liquid onto the medium M supported by the support unit 17*a*, and the dropping unit 90 as an example of a dyeing unit configured to dye the medium M by dropping the dyeing liquid DL. The printing is performed on the medium M by combining the dyeing by the dropping unit 90 and the ejecting at the liquid ejecting unit 20. According to this configuration, banding does not occur in the portion where the medium M is dyed (for example, background, etc.). Thus, high quality printing with suppressed banding can be performed.

(2-2) The dropping unit 90 includes a nozzle 90*a* to drop the dyeing liquid DL, wherein a plurality of the nozzles 90*a* are disposed side by side in the width direction of the medium M. According to this configuration, the dyeing liquid is dropped from the plurality of nozzles disposed side by side in the width direction of the medium, whereby the medium is dyed. The dyeing is performed on the entire width direction of the medium, so that banding that tends to occur in the scanning type liquid ejecting unit can be suppressed.

(2-3) The dropping unit 90 can perform dyeing in accordance with the printing data, and the dyeing liquid DL can perform dropping in accordance with the location at which the liquid is ejected by the liquid ejecting unit 20. According to this configuration, the dropping unit 90 drops the dyeing liquid DL in accordance with the printing data, whereby a high-quality printed material can be provided. The dropping unit 90 can perform dyeing while avoiding a handle pattern printed by the liquid ejecting unit 20 or the pattern printed therefrom. In addition, when the dye extracting agent and the dye preventing agent are ejected from the liquid ejecting unit 20, the dyeing liquid can be ejected to overlap the location at which the dye extracting agent or the dye preventing agent is imparted.

(2-4) The liquid ejecting unit 20 is capable of ejecting at least one of a dye extracting agent for extracting the color of the medium M or a dye preventing agent for preventing coloring due to dyeing. According to this configuration, the dye extracting agent or the dye preventing agent can be ejected from the liquid ejecting unit 20, whereby a fine image or gradation can be generated with respect to the medium M.

(2-5) The printing apparatus 11 includes the liquid storage unit 40 capable of supplying liquid to the liquid ejecting unit 20. The liquid stored in the liquid storage unit 40 is at least used as part of the dyeing liquid DL. According to this configuration, as part of the dyeing liquid DL, the ink obtained from the liquid storage unit 40 (ink storage unit 40A) is used. As a result, printing can be performed without newly preparing the dyeing liquid DL. In addition, when the dyeing liquid DL is insufficient during printing, the need for new preparation is omitted.

(2-6) The liquid storage unit 40 stores liquids having a plurality of colors. The liquids having a plurality of colors are combined and used as at least part of the dyeing liquid DL. According to this configuration, by combining the ink having the plurality of colors stored in the liquid storage unit 40, the dyeing liquid DL having a specific color can be generated.

(2-7) The liquid discharged by the liquid ejecting unit 20 as maintenance operation is at least used as part of the dyeing liquid DL. According to this configuration, the liquid discharged in the maintenance operation that has been discarded in the recent configuration is used as the dyeing liquid DL, whereby the environmental load can be reduced.

(2-8) The printing system 10 including the printing apparatus 11 includes the drying mechanism 100 configured to dry both the medium M onto which ink is ejected from the liquid ejecting unit 20 and the medium M dyed by the dropping unit 90. According to this configuration, drying after ejecting in the liquid ejecting unit 20 and drying after dyeing in the dropping unit 90 can be performed by one mechanism, so drying can be performed without increasing the size of the device.

Note that the above-described exemplary embodiment may be modified as the following modified examples. Furthermore, the above-described exemplary embodiment and the modified examples described below can be further modified as appropriate, or combinations of the following modified examples in appropriate combinations can be used as further modified examples.

Dyeing by the dyeing unit may be performed in advance, and then the liquid ejecting unit 20 may eject the liquid and perform printing on the medium M. For example, the dyeing unit may perform dyeing on the medium M with white dyeing liquid, and then the liquid ejecting unit 20 may eject liquid (ink) to be printed onto the medium M. Here, the dyeing unit may be the dyeing unit 50 of the first exemplary embodiment or the dropping unit 90 of the second exemplary embodiment.

In the exemplary embodiments described above, only the dye extracting agent may be ejected, or only the dye preventing agent may be ejected. Furthermore, both the dye extracting agent and the dye preventing agent may be exchanged so that both can be ejected.

The liquid ejecting unit 20 may include at least one of a nozzle 21N that ejects the dye extracting agent and a nozzle 21N that ejects the dye preventing agent, in addition to a nozzle 21N that ejects ink having N colors. In addition, at least one of the dye extracting agent and the dye preventing agent may be switched to be ejectable from the nozzle 21N by switching the supply source of the liquid supplied to the nozzle 21N among the ink storage unit 40A, the pre-treatment agent storage unit 40B, and the post-treatment agent storage unit 40C.

In the second exemplary embodiment, roller printing and screen printing may be used instead of the dropping unit 90.

A liquid ejecting head 21 capable of ejecting the dye extracting agent, and a liquid ejecting head 21 capable of ejecting the dye preventing agent may be provided.

In each exemplary embodiment described above, ink from the ink storage unit 40A is used for part of the dyeing liquid DL, but ink from the ink storage unit 40A may be used for all of the dyeing liquid DL.

In each exemplary embodiments described above, a configuration may be adopted wherein only the medium M printed by the liquid ejecting unit 20 may be dried by the drying mechanism 100, or a configuration may be adopted wherein only the medium M printed by the dyeing unit 50 or the dropping unit 90 as an example of the dyeing unit may be dried.

In the operation of the printing apparatus 11, any one of the cleaning liquid CL and the dyeing liquid DL may be stored in the cleaning liquid storage unit 32. In addition, in the operation of the printing apparatus 11, any one of the cleaning liquid CL, the dyeing liquid DL, and the pre-treatment agent liquid may be stored in the cleaning liquid storage unit 32. Furthermore, in the operation of the printing apparatus 11, any one of the cleaning liquid CL, the dyeing liquid DL, the pre-treatment agent liquid, and the post-treatment agent may be stored in the cleaning liquid storage unit 32.

The holding tank may only include the holding tank 55 that holds the cleaning liquid CL, the holding tank 56 that holds the dyeing liquid DL, and the holding tank 57 that holds the pre-treatment agent L1, or may be configured with four or more, including at least three of these holding tanks. Further, it may be configured with only the holding tank 55, 56.

A pump for moving the liquid to the holding tank may be provided.

Liquid (waste liquid) ejected or discharged from the liquid ejecting unit 20 is used as the dyeing liquid DL in the maintenance operation by the maintenance unit 60, but all the dyeing liquid DL may be liquid supplied from the liquid storage unit 40.

The toning may be performed by manually opening the open/close valve 75.

A toning liquid tank for toning may be provided, the dyeing liquid from the dyeing liquid storage unit 71 may be fed to the toning liquid tank, and after the dyeing liquid has been agitated and toned in the toning liquid tank, the dyeing liquid DL that has been subjected to the toning from the toning liquid tank may be supplied to the storage tank 34 of the cleaning liquid storage unit 32.

The transport unit 16 may use a roller transport type instead of a belt transport type.

The printing apparatus 11 is not limited to a printing device for performing printing on a cloth, but may be a printing apparatus that performing printing on a medium such as paper.

The printing apparatus 11 is not limited to a serial printer in which the liquid ejecting unit 20 reciprocates in the scanning direction X, but may be a lateral type printer in which the liquid ejecting unit 20 is movable in two directions, a scanning direction (main scanning direction) and a transport direction Y (secondary scanning direction).

The medium M is not limited to a cloth, but may be paper, flexible plastic film, nonwoven fabric, etc., or may be a laminate sheet. Note that, for a plastic film and a laminated sheet that do not have fibers, dyeing includes the formation of a surface layer such as an ink layer by attaching liquid such as ink at the surface by immersion of the medium M. The surface layer of this type includes a coating layer, a surface treatment layer, etc. depending on the type of liquid. The surface treatment layer includes an anti-bleeding treatment layer, etc.

Hereinafter, technical concepts and effects thereof that are understood from the above-described exemplary embodiments and modified examples will be described.

A printing apparatus includes a transport belt including a support unit configured to support a medium, the transport belt being configured to transport a medium by moving the support unit, a liquid ejecting unit configured to eject liquid onto a medium supported by the support unit, and a dyeing unit configured to perform dyeing by immersing a medium in dyeing liquid, wherein the printing apparatus is configured to perform printing on a medium by combining dyeing by the dyeing unit and ejecting by the liquid ejecting unit. In addition, "immersing" means dyeing by passing the medium through liquid, which is different from the configuration in which liquid is ejected and then printing is performed.

According to this configuration, dyeing and other printing can be performed by one apparatus, whereby banding does not occur in the portion where the medium is dyed (e.g., background, etc.). Thus, high quality printing with suppressed banding can be performed.

In the printing apparatus described above, the liquid ejecting unit may be configured to eject at least one of a dye extracting agent or a dye preventing agent, the dye extracting agent being configured to extract a color of a medium, the dye preventing agent being configured to prevent coloring due to dyeing.

According to this configuration, the dye extracting agent or the dye preventing agent can be ejected from the head, whereby a fine image or gradation can be generated with respect to the medium.

The printing apparatus described above includes a cleaning unit configured to perform cleaning operation on the transport belt using cleaning liquid, and a cleaning liquid storage unit configured to store the cleaning liquid, wherein when dyeing is performed by the dyeing unit, the dyeing liquid may be stored in the cleaning liquid storage unit.

According to this configuration, when the liquid ejecting unit is ejecting liquid, the transport belt is cleaned using the cleaning liquid stored in the cleaning liquid storage unit. When dyeing is performed by the dyeing unit, dyeing is performed by storing the dyeing liquid in the cleaning liquid storage unit. At this time, the cleaning liquid is extracted from the cleaning liquid storage unit, and instead the dyeing liquid is filled. Therefore, it is not necessary to provide a tank for dyeing.

The printing apparatus described above includes a liquid storage unit configured to supply liquid to the liquid ejecting unit, wherein liquid stored in the liquid storage unit may be used as at least part of the dyeing liquid.

According to this configuration, liquid obtained from the liquid storage unit is used as part of the dyeing liquid. As a result, printing can be performed without newly preparing the dyeing liquid. In addition, when the dyeing liquid is insufficient during printing, the need for new preparation is omitted.

In the printing apparatus described above, the liquid storage unit may be configured to store liquids having a plurality of colors, and the liquids having the plurality of colors may be used as at least part of the dyeing liquid by combining the liquids having the plurality of colors.

According to this configuration, by combining the inks having the plurality of colors stored in the liquid storage unit, the dyeing liquids having a specific color can be generated.

In the printing apparatus described above, liquid discharged by the liquid ejecting unit as maintenance operation may be used as at least part of the dyeing liquid.

According to this configuration, the liquid discharged in the maintenance operation that has been discarded in the recent configuration is used as the dyeing liquid, whereby the environmental load can be reduced.

A printing system includes the above printing apparatus, and a drying mechanism configured to dry both a medium printed by the liquid ejecting unit and a medium dyed by the dyeing unit.

According to this configuration, drying after ejecting in the liquid ejecting unit and drying after dyeing in the dyeing unit can be performed by one mechanism, so drying can be performed without increasing the size of the device.

The printing apparatus described above includes a cleaning unit configured to perform cleaning operation on the transport belt using cleaning liquid, and a cleaning liquid storage unit configured to store the cleaning liquid, wherein the cleaning liquid storage unit may be configured to store a pre-treatment agent prior to the ejecting in a case where the ink is ejected from the liquid ejecting unit, and pre-treatment may be performed by immersing a medium in the pre-treatment agent stored in the cleaning liquid storage unit.

According to this configuration, by storing the pre-treatment agent in the cleaning liquid storage unit, a location for newly storing the pre-treatment agent is not provided, whereby the device can be made smaller.

The printing system is a printing system including the above printing apparatus, wherein the cleaning liquid storage unit is configured to store the cleaning liquid or the dyeing liquid, and the printing system includes a holding tank coupled to the cleaning liquid storage unit, the holding tank being configured to hold the cleaning liquid or the dyeing liquid stored in the cleaning liquid storage unit.

According to this configuration, the tank is provided that temporarily holds the liquid stored in the cleaning liquid storage unit, whereby the liquid stored prior to replacing the liquid is not wasted.

The printing apparatus includes a transport belt including a support unit configured to support a medium, the transport belt being configured to transport a medium by moving the support unit, a liquid ejecting unit configured to eject liquid onto a medium supported by the support unit, and a dyeing unit configured to perform dyeing on a medium by dropping dyeing liquid, wherein the printing apparatus is configured to perform printing on a medium by combining dyeing by the dyeing unit and ejecting by the liquid ejecting unit.

According to this configuration, dyeing and other printing can be performed by one apparatus, whereby banding does not occur in the portion where the medium is dyed (e.g., background, etc.). Thus, high quality printing with suppressed banding can be performed.

In the printing apparatus described above, the dyeing unit may include a nozzle configured to drop the dyeing liquid, a plurality of the nozzles being disposed side by side in a width direction of a medium.

According to this configuration, the dyeing liquid is dropped from the plurality of nozzles disposed side by side in the width direction of the medium, whereby the medium is dyed. The dyeing is performed on the entire width direction of the medium, so that banding that tends to occur in the scanning type liquid ejecting unit can be suppressed.

In the printing apparatus described above, the dyeing unit may be configured to perform dyeing in accordance with printing data, and configured to drop the dyeing liquid in accordance with a location at which liquid is ejected by the liquid ejecting unit.

According to this configuration, the dyeing unit drops the dyeing liquid DL in accordance with the printing data, whereby a high-quality printed material can be provided.

In the printing apparatus described above, the liquid ejecting unit may be configured to eject at least one of a dye extracting agent or a dye preventing agent, the dye extracting agent being configured to extract a color of a medium, the dye preventing agent being configured to prevent coloring due to dyeing.

According to this configuration, the dye extracting agent or the dye preventing agent can be ejected from the head, whereby a fine image or gradation can be generated with respect to the medium.

The printing apparatus described above includes a liquid storage unit configured to supply liquid to the liquid ejecting unit, wherein liquid stored in the liquid storage unit may be used as at least part of the dyeing liquid.

According to this configuration, liquid (for example, ink) obtained from the liquid storage unit is used as part of the dyeing liquid. As a result, printing can be performed without newly preparing the dyeing liquid. In addition, when the dyeing liquid is insufficient during printing, the need for new preparation is omitted.

In the printing apparatus described above, the liquid storage unit may be configured to store liquids having a plurality of colors, and the liquids having the plurality of colors may be used as at least part of the dyeing liquid by being combined.

According to this configuration, by combining the ink having the plurality of colors stored in the liquid storage unit, the dyeing liquids having a specific color can be generated.

In the printing apparatus described above, liquid discharged by the liquid ejecting unit as maintenance operation may be used as at least part of the dyeing liquid.

According to this configuration, the liquid discharged in the maintenance operation that has been discarded in the recent configuration is used as the dyeing liquid, whereby the environmental load can be reduced.

A printing system including the printing apparatus described above, the system including a drying mechanism configured to dry both a medium onto which ink is ejected from the liquid ejecting unit and a medium dyed by the dyeing unit.

According to this configuration, drying after ejecting in the liquid ejecting unit and drying after dyeing in the dyeing unit can be performed by one mechanism, so drying can be performed without increasing the size of the device.

A printing system including the printing apparatus, the system including a cleaning unit configured to perform cleaning operation on the transport belt using cleaning liquid, and a cleaning liquid storage unit configured to store the cleaning liquid, wherein the cleaning liquid storage unit may be configured to store a pre-treatment agent in a case where the ink is ejected from the liquid ejecting unit, and pre-treatment may be performed by immersing a medium in the pre-treatment agent stored in the cleaning liquid storage unit.

According to this configuration, by placing the pre-treatment agent in the cleaning liquid storage unit, a location at which the pre-treatment agent is newly stored is not provided, whereby the printing system can be made smaller.

In the printing system described above, the cleaning liquid storage unit is configured to store the cleaning liquid or the pre-treatment agent, and the printing system includes a holding tank coupled to the cleaning liquid storage unit, the holding tank being configured to hold the cleaning liquid or the pre-treatment agent discharged from the cleaning liquid storage unit.

According to this configuration, the cleaning liquid or the pre-treatment agent stored in the cleaning liquid storage unit can be temporarily held in the tank, whereby the previously stored liquid is not wasted when replacing the liquid.

A printing method for a printing apparatus including a transport belt including a support unit configured to support a medium, the transport belt being configured to transport a medium by moving the support unit, a liquid ejecting unit configured to eject liquid onto a medium supported by the support unit, a cleaning unit configured to perform cleaning operation on the transport belt using cleaning liquid, a cleaning liquid storage unit configured to store the cleaning liquid, and a dyeing unit configured to perform dyeing by immersing a medium in dyeing liquid, the method including ejecting liquid from the liquid ejecting unit, storing the dyeing liquid in the cleaning liquid storage unit, and performing dyeing on a medium with the dyeing liquid.

According to this method, dyeing and other printing can be performed by one printing apparatus, whereby banding does not occur in the portion where the medium is dyed (for example, background, etc.). Thus, high quality printing with suppressed banding can be performed.

What is claimed is:

1. A printing apparatus comprising:

a housing having a cover;

a transport belt including a support unit configured to support a medium, the transport belt being configured to transport a medium by moving the support unit;

a liquid ejecting unit configured to eject liquid onto a medium supported by the support unit; and a dyeing unit configured to perform dyeing by immersing a medium in dyeing liquid, wherein the printing apparatus is configured to perform printing on a medium by combining dyeing by the dyeing unit and ejecting by the liquid ejecting unit, and the cover covers transport belt, the liquid ejecting unit, and the dyeing unit.

2. The printing apparatus according to claim 1, wherein the liquid ejecting unit is configured to eject at least one of a dye extracting agent or a dye preventing agent, the dye extracting agent being configured to extract a color of a medium, the dye preventing agent being configured to prevent coloring due to dyeing.

3. The printing apparatus according to claim 1, comprising:

a cleaning unit configured to perform cleaning operation on the transport belt using cleaning liquid; and a cleaning liquid storage unit configured to store the cleaning liquid, wherein when dyeing is performed by the dyeing unit, the cleaning liquid storage unit is used as the dyeing unit by storing the dyeing liquid in the cleaning liquid storage unit.

4. A printing system including the printing apparatus according to claim 3, wherein the cleaning liquid storage unit is configured to store the cleaning liquid or the dyeing liquid, and the printing system includes a holding tank coupled to the cleaning liquid storage unit, the holding tank being configured to hold the cleaning liquid or the dyeing liquid stored in the cleaning liquid storage unit.

5. The printing apparatus according to claim 1, comprising a liquid storage unit configured to supply liquid to the liquid ejecting unit, wherein liquid stored in the liquid storage unit is at least used as part of the dyeing liquid.

6. The printing apparatus according to claim 5, wherein the liquid storage unit is configured to store liquids having a plurality of colors, and the liquids having the plurality of colors are at least used as part of the dyeing liquid by being combined.

7. The printing apparatus according to claim 1, wherein liquid discharged by the liquid ejecting unit as maintenance operation is at least used as part of the dyeing liquid.

8. A printing system comprising:

the printing apparatus according to claim 1; and a drying mechanism configured to dry both a medium printed by the liquid ejecting unit and a medium dyed by the dyeing unit.

9. A printing system comprising:

the printing apparatus according to claim 1; and a cleaning unit configured to perform cleaning operation on the transport belt using cleaning liquid and a cleaning liquid storage unit configured to store the cleaning liquid, wherein a pre-treatment agent is stored in the cleaning liquid storage unit prior to the ejecting, and pre-treatment is performed by immersing a medium in the pre-treatment agent stored in the cleaning liquid storage unit.

10. A printing system including the printing apparatus of claim 1, the system comprising:

a cleaning unit configured to perform cleaning operation on the transport belt using cleaning liquids; and a cleaning liquid storage unit configured to store the cleaning liquid, wherein the cleaning liquid storage unit is configured to store a pre-treatment agent, and pre-treatment is performed by immersing a medium in the pre-treatment agent stored in the cleaning liquid storage unit.

11. The printing system according to claim 10, wherein the cleaning liquid storage unit is configured to store the cleaning liquid or the pre-treatment agent, and the printing system includes a holding tank coupled to the cleaning liquid storage unit, the holding tank being configured to hold the cleaning liquid or the pre-treatment agent discharged from the cleaning liquid storage unit.

* * * * *